United States Patent [19]
Sumiya et al.

[11] Patent Number: 5,645,804
[45] Date of Patent: Jul. 8, 1997

[54] METHOD FOR CLEANING EXHAUST GAS CONTAINING NITROGEN OXIDES

[75] Inventors: Satoshi Sumiya; Seiji Makino; Kiyohide Yoshida; Yoshikazu Takahashi; Masataka Furuyama; Akira Abe; Nobuyuki Matsumura; Gyo Muramatsu, all of Kumagaya, Japan

[73] Assignee: Kabushiki Kaisha Riken, Tokyo, Japan

[21] Appl. No.: 453,086

[22] Filed: May 30, 1995

Related U.S. Application Data

[63] Continuation of Ser. No. 901,067, Jun. 19, 1992, abandoned.

[30] Foreign Application Priority Data

| Jun. 28, 1991 | [JP] | Japan | 3-183319 |
| Jul. 31, 1991 | [JP] | Japan | 3-214323 |
| Jan. 28, 1992 | [JP] | Japan | 4-037299 |
| Feb. 24, 1992 | [JP] | Japan | 4-072913 |
| Apr. 23, 1992 | [JP] | Japan | 4-130184 |
| Apr. 23, 1992 | [JP] | Japan | 4-130195 |

[51] Int. Cl.$^6$ .................................. B01D 53/56
[52] U.S. Cl. .................. 423/239.1; 423/213.2; 423/213.5
[58] Field of Search ............... 423/239.1, 239.2, 423/215.5, 212, 213.2, 213.5

[56] References Cited

U.S. PATENT DOCUMENTS

| 3,827,238 | 8/1974 | Hayashi | 60/286 |
| 4,097,576 | 6/1978 | Tamura et al. | 423/239.2 |
| 4,117,081 | 9/1978 | Inaba et al. | 423/239.1 |
| 4,221,768 | 9/1980 | Inoue et al. | 423/213.5 |
| 4,915,036 | 4/1990 | DeVita | 110/215 |
| 4,985,218 | 1/1991 | DeVita | 423/235 |
| 5,041,270 | 8/1991 | Fujitani et al. | 423/213.2 |
| 5,041,272 | 8/1991 | Tamura et al. | 423/212 |
| 5,075,274 | 12/1991 | Kiyohide et al. | 429/215.5 |
| 5,154,901 | 10/1992 | Yoshida et al. | 423/239 |

FOREIGN PATENT DOCUMENTS

| 459396 | 4/1991 | European Pat. Off. | 423/239.2 |
| 0441401 | 8/1991 | European Pat. Off. | |
| 2231416 | 12/1974 | France | |
| 3515843 | 11/1986 | Germany | |
| 4016688 | 6/1991 | Germany | |
| 44-13002 | 6/1969 | Japan | |
| 49-122474 | 11/1974 | Japan | |
| 54-79161 | 6/1979 | Japan | |
| 62-298452 | 12/1987 | Japan | 423/239.1 |
| 63-100919 | 5/1988 | Japan | |
| 1578149 | 11/1980 | United Kingdom | |
| 2248560 | 4/1992 | United Kingdom | |

OTHER PUBLICATIONS

Ault, J.W., et al. "Catalytic Reduction of Nitric Oxide with various Hydrocarbons", A.I. Ch. E. Journal, vol. 17, #2, pp. 265–271 (1971).

Grant, C., et al. "Chemical Dictionary", 4th ed. McGraw Hill New York (1987), pp. 183 & 382.

Primary Examiner—Wayne Langel
Assistant Examiner—Peter T. DiMauro
Attorney, Agent, or Firm—Browdy and Neimark

[57] ABSTRACT

The method of cleaning an exhaust gas containing nitrogen oxides including disposing an exhaust gas cleaner comprising a heat-resistant, porous body, which may support a catalyst consisting essentially of (a) at least one of alkali metal elements; (b) at least one of elements selected from the group consisting of Cu, Co, Mn and V, (c) at least one of rare earth elements, in a flow path of the exhaust gas, spraying a liquid hydrocarbon into a stream of the exhaust gas on the upstream side of the exhaust gas cleaner, thereby causing atomized and gasified hydrocarbon to function as a reducing agent for reducing the nitrogen oxides in the exhaust gas.

24 Claims, 6 Drawing Sheets

Stream of Exhaust Gas

○ Example 34

REMOVAL RATIO OF NOx (%)

TEMPERATURE OF TEST GAS (°C)

METHOD FOR CLEANING EXHAUST GAS CONTAINING NITROGEN OXIDES

This application is a continuation of application Ser. No. 07/901,067, filed Jun. 19, 1992 now abandoned.

BACKGROUND OF THE INVENTION

The present invention relates to a method of cleaning an exhaust gas discharged from internal combustion engines such as automobile engines, etc. and an apparatus for cleaning such an exhaust gas, and more particularly to a method of cleaning an exhaust gas of diesel engines, etc. by efficiently reducing nitrogen oxides in the exhaust gas, and an apparatus for conducting such an exhaust gas-cleaning method.

Recently, environmental pollution has become a serious problem in a global scale, and among them, air pollution such as photochemical smog and acidic rain caused by nitrogen oxides such as nitrogen monoxide, nitrogen dioxide (hereinafter referred to simply as "NOx") in the air is a serious problem. NOx is generated from automobile engines such as diesel engines, and large combustion apparatuses such as cogenerators. Also, fun heaters and other combustion equipments which are widely used at home are sources of nitrogen oxides.

In the case of exhaust gas from gasoline engines, NOx is usually removed by using so-called three-component catalysts. Also, in the case of large, stationary combustion apparatuses such as internal combustion engines for cogenerators, metal oxide catalysts such as $V_2O_5$ are used, and ammonia is introduced into exhaust gas, whereby nitrogen oxides in the exhaust gas are catalytically and selectively reduced.

However, in the case of an exhaust gas having a relatively high oxygen concentration such as those discharged from diesel engines and those discharged from gasoline engines operable in a lean state, efficient removal of NOx cannot be achieved with the above-described three-component catalysts suitable for usual gasoline engines. Also, the reduction of NOx with ammonia introduced into an exhaust gas cannot be applied to movable exhaust gas sources such as automobiles, because this reduction system needs large apparatuses and poisonous, expensive ammonia.

Therefore, it has been desired to develop a method of reducing NOx in the exhaust gas having a relatively high oxygen concentration which is discharged from diesel engines, etc., and various attempts have been made so far.

For instance, there have been proposed methods of reducing NOx in an exhaust gas with a hydrocarbon introduced into the exhaust gas. One example of such methods is disclosed by Japanese Patent Publication No. 44-13002, which comprises passing an exhaust gas through a honeycomb-type ceramic filter carrying a platinum-group metal catalyst while controlling the temperature and flow rate of the exhaust gas, and adding a gaseous reducing fuel (specifically, methane, etc.) to the exhaust gas.

However, this method fails to efficiently reduce NOx in the exhaust gas discharged from diesel engines, etc. According to research by the inventors, even though a hydrocarbon having a small carbon number which is in a gas state in a normal condition, such as methane, propane, etc. is added as an NOx-reducing agent to the exhaust gas discharged from diesel engines, a large removal ratio of NOx cannot be obtained.

There has also been proposed a method of cleaning an exhaust gas, which comprises mixing an exhaust gas containing oxygen and NOx with a hydrocarbon to cause a reaction between oxygen and a hydrocarbon such that the hydrocarbon is partially oxidized to a reducing hydrogen gas and carbon monoxide and to lower the oxygen concentration, the resulting hydrogen gas and carbon monoxide being reacted with NOx in the exhaust gas, thereby decomposing them to nitrogen, carbon dioxide and water (Japanese Patent Laid-Open No. 49-122474). However, since the reduction reaction of NOx should be conducted at a relatively high temperature in this method, it is not suitable for cleaning the exhaust gas of automobiles.

There is an alternative method for reducing NOx which comprises adding a petroleum fuel as a reducing agent to a combustion exhaust gas in a high-temperature region alone or together with part of the combustion exhaust gas with or without air, and adding an air to the combustion exhaust gas in the downstream to reduce NOx in the combustion exhaust gas, the addition of the petroleum fuel such as methane, propane, gasoline, kerosine, naphtha, heavy oil, etc. being conducted by a plurality of steps such that a ratio of the amount of oxygen remaining in the exhaust gas to the amount of oxygen necessary for completely burning the petroleum fuel added is within a particular range (Japanese Patent Laid-Open No. 54-79161).

However, this method cannot remove NOx efficiently without keeping a region where a reducing agent and NOx are reacted at 1000° C. or higher. Thus, this method is also not suitable for cleaning the exhaust gas of automobiles.

There has been proposed a method of reducing NOx by using a catalyst such as zeolite and $Al_2O_3$, etc. containing copper, and adding a hydrocarbon having a small carbon number to the exhaust gas (SAE Technical Paper 900496, 1990, and Japanese Patent Laid-Open No. 63-100919). However, catalysts used in this method are poor in heat resistance, durability and low-temperature characteristics, and the method using such catalysts fails to achieve a high reduction ratio of NOx at a low temperature and when the exhaust gas has a high oxygen concentration. Accordingly, it cannot be used for practical purposes.

OBJECT AND SUMMARY OF THE INVENTION

Accordingly, an object of the present invention is to provide an method capable of efficiently removing NOx from an exhaust gas having a relatively high oxygen concentration, which is discharged from diesel engines, at a relatively low temperature such as an exhaust gas temperature of automobiles.

Another object of the present invention is to provide an apparatus for efficiently removing NOx by the above method.

As a result of intense research in view of the above objects, the inventors have found that by disposing an exhaust gas cleaner comprising a heat-resistant, porous filter in a flow path of the exhaust gas, and introducing hydrocarbons such as alkines, alkenes, alcohols and liquid hydrocarbons such as kerosene and diesel oil into a stream of the exhaust gas on the upstream side of the exhaust gas cleaner, NOx can be efficiently reduced and removed by the hydrocarbons introduced into the exhaust gas without necessitating the heating of an exhaust gas cleaner. The inventors further have found that by adding an air together with a hydrocarbon to control the oxygen concentration in the exhaust gas, the reduction efficiency of NOx is increased. The inventors have further found that by using a porous filter carrying a small amount of a catalyst via a porous ceramic powder layer, the reduction efficiency of NOx is increased. The present invention is based on the above findings.

Thus, the first method of cleaning an exhaust gas containing nitrogen oxides according to the present invention comprises disposing an exhaust gas cleaner comprising a heat-resistant, porous body in a flow path of the exhaust gas, spraying a liquid hydrocarbon into a stream of said exhaust gas on the upstream side of the exhaust gas cleaner, thereby causing atomized and gasified hydrocarbon to function as a reducing agent for reducing the nitrogen oxides in the exhaust gas.

In the first method of cleaning an exhaust gas, the spraying of the liquid hydrocarbon is preferably carried out by using a compressed air.

The apparatus for cleaning an exhaust gas containing nitrogen oxides according to the present invention comprises (1) a pipe through which the exhaust gas passes, (2) an exhaust gas cleaner comprising a heat-resistant, porous body and disposed in the pipe, and (3) a spray means having a nozzle disposed in the pipe on the upstream side of the exhaust gas cleaner for spraying a liquid hydrocarbon into a stream of the exhaust gas, thereby causing atomized and gasified hydrocarbon to function as a reducing agent for reducing the nitrogen oxides in the exhaust gas.

The second method of cleaning an exhaust gas containing nitrogen oxides according to the present invention comprises disposing an exhaust gas cleaner comprising a heat-resistant, porous body having a porosity of 20–90% and coated with a porous ceramic powder layer having a specific surface area of 2 m$^2$/g or more, in a flow path of the exhaust gas, spraying a liquid hydrocarbon into a stream of the exhaust gas on the upstream side of the exhaust gas cleaner, the heat-resistant, porous body further carrying a catalyst via the porous ceramic powder layer, the catalyst consisting essentially of:

(a) at least one of alkali metal elements; and (b) at least one of elements selected from the group consisting of Cu, Co, Mn and V, the porous ceramic powder layer being 5–20 weight % based on the porous body, the catalyst being 0.05–15 weight % based on the porous ceramic powder layer, and the temperature of the exhaust gas passing through the exhaust gas cleaner being kept at 200°–600° C., whereby the liquid hydrocarbon functions as a reducing agent for reducing nitrogen oxides in the exhaust gas.

The third method of cleaning an exhaust gas containing nitrogen oxides according to the present invention comprises disposing an exhaust gas cleaner comprising a heat-resistant, porous ceramic body in a flow path of the exhaust gas, and introducing a hydrocarbon selected from the group consisting of alkines, alkenes, alcohols and liquid hydrocarbons into a stream of the exhaust gas on the upstream side of the exhaust gas cleaner, the heat-resistant, porous ceramic body carrying a catalyst consisting essentially of:

(b) at least one of elements selected from the group consisting of Cu, Co, Mn and V; and (c) at least one of rare earth elements, the catalyst being 0.5–15 weight % based on the porous ceramic body, and bringing the hydrocarbon into contact with the catalyst at a temperature of 200°–600° C., whereby gasified hydrocarbon functions as a reducing agent for reducing nitrogen oxides in the exhaust gas.

The fourth method of cleaning an exhaust gas containing nitrogen oxides and oxygen in a larger amount than a stoichiometric amount relative to unburned components in the exhaust gas according to the present invention comprises disposing an exhaust gas cleaner comprising a heat-resistant, porous ceramic body and a catalyst supported by the porous ceramic body in a flow path of the exhaust gas; introducing a hydrocarbon into a stream of the exhaust gas on the upstream side of the exhaust gas cleaner; and bringing the hydrocarbon into contact with the catalyst at a temperature of 200°–600° C., the catalyst consisting essentially of:

(a) at least one of alkali metal elements; and (b) at least one of elements selected from the group consisting of Cu, Co, Mn and V; and (c) at least one of rare earth elements, the catalyst being 5–20 weight % as metal components based on the porous ceramic body, whereby the hydrocarbon is reacted as a reducing agent with nitrogen oxides in the exhaust gas.

The fifth method of cleaning an exhaust gas containing nitrogen oxides and oxygen in a larger amount than a stoichiometric amount relative to unburned components in the exhaust gas according to the present invention comprises disposing an exhaust gas cleaner comprising a heat-resistant, porous ceramic body and a catalyst supported by the porous ceramic body in a flow path of the exhaust gas; introducing a hydrocarbon into a stream of the exhaust gas on the upstream side of the exhaust gas cleaner; and bringing the hydrocarbon into contact with the catalyst at a temperature of 200°–600° C., the catalyst consisting essentially of (b) at least one of elements selected from the group consisting of Cu, Co, Mn and V, the catalyst being 5–20 weight % as a metal component based on the porous ceramic body, whereby the hydrocarbon is reacted as a reducing agent with nitrogen oxides in the exhaust gas.

DETAILED DESCRIPTION OF THE INVENTION

The present invention will be explained in detail below.

[1] Exhaust Gas-Cleaning Apparatus

[A] Overall System (1) First Embodiment

Figure 1:
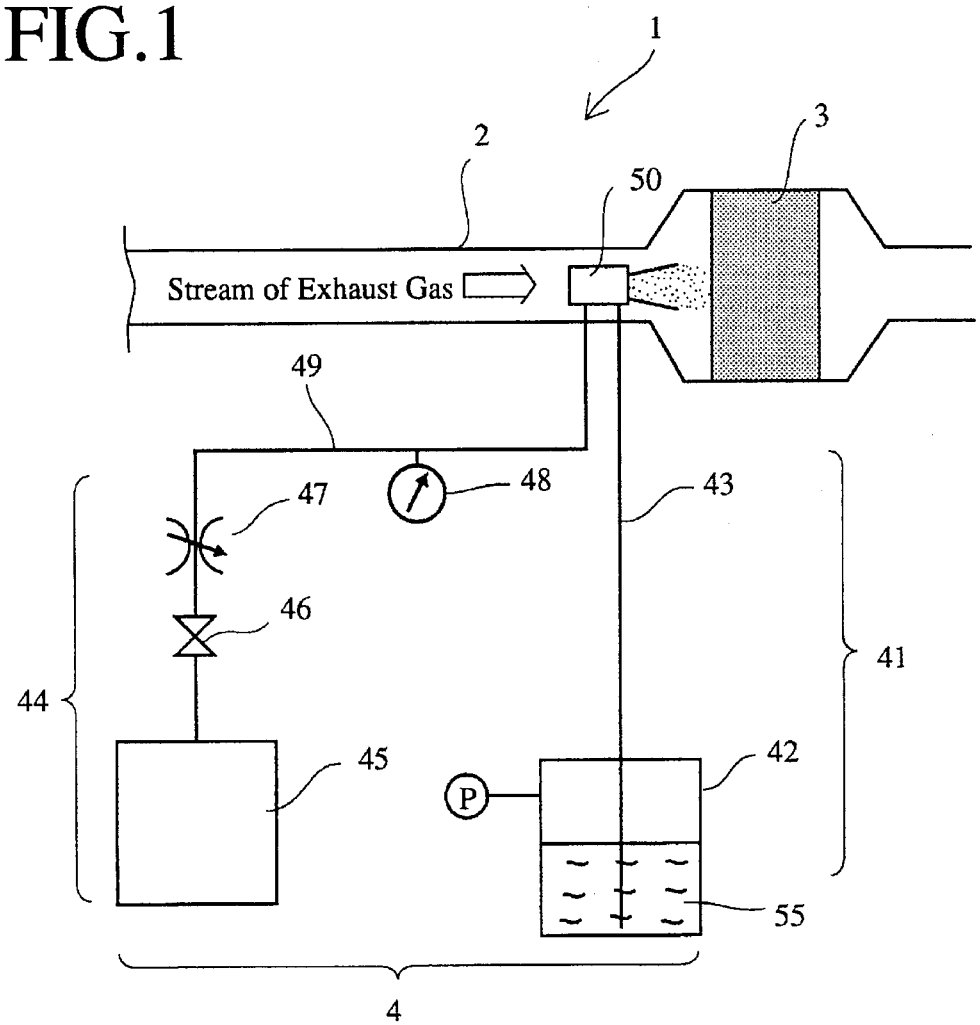
FIG. 1 is a schematic view showing an exhaust gas-cleaning apparatus according to one embodiment of the present invention.

FIG. 1 schematically shows an exhaust gas-cleaning apparatus according to one embodiment of the present invention. The exhaust gas-cleaning apparatus 1 comprises a pipe 2 through which an exhaust gas passes, an exhaust gas cleaner 3 comprising a heat-resistant, porous body disposed in the pipe 2, and a liquid hydrocarbon supply system 4 comprising a spray means 50 disposed in the pipe 2 on the upstream side of the exhaust gas cleaner 3 for spraying a liquid hydrocarbon into a stream of the exhaust gas.

In this embodiment, the liquid hydrocarbon supply system 4 comprises a liquid hydrocarbon supply means 41 and a means 44 for supplying an air to spray the liquid hydrocarbon. The liquid hydrocarbon supply means 41 comprises a liquid hydrocarbon-storing tank 42, and a pipe 43 communicating with a spray nozzle 50 for supplying the liquid hydrocarbon to the spray nozzle 50. As shown in FIG. 1, the liquid hydrocarbon 55 is stored in the tank 42, and the pipe 43 extends deep into the liquid hydrocarbon 55 in the tank 42. Also, the air supply means 44 comprises a compressed air accumulator 45, a pipe 49 extending between the compressed air accumulator 45 and the spray nozzle 50 for supplying an air from the accumulator 45 to the spray nozzle 50, a switch valve 46 mounted to the air supply pipe 49 near the accumulator 45 for permitting and shutting the supply of the compressed air, a throttle valve 47 mounted to the air supply pipe 49 on the downstream side of the switch valve 46 for controlling the flow rate of the compressed air, and a pressure gauge 48 mounted to the air supply pipe 49 on the downstream side of the throttle valve 47 for measuring the pressure of the compressed air. the liquid hydrocarbon supply means 41 and the compressed air supply means 44 are converged in the spray nozzle 50, so that the liquid hydrocarbon supplied through the pipe 43 is atomized by the compressed air supplied through the pipe 49.

Figure 2:
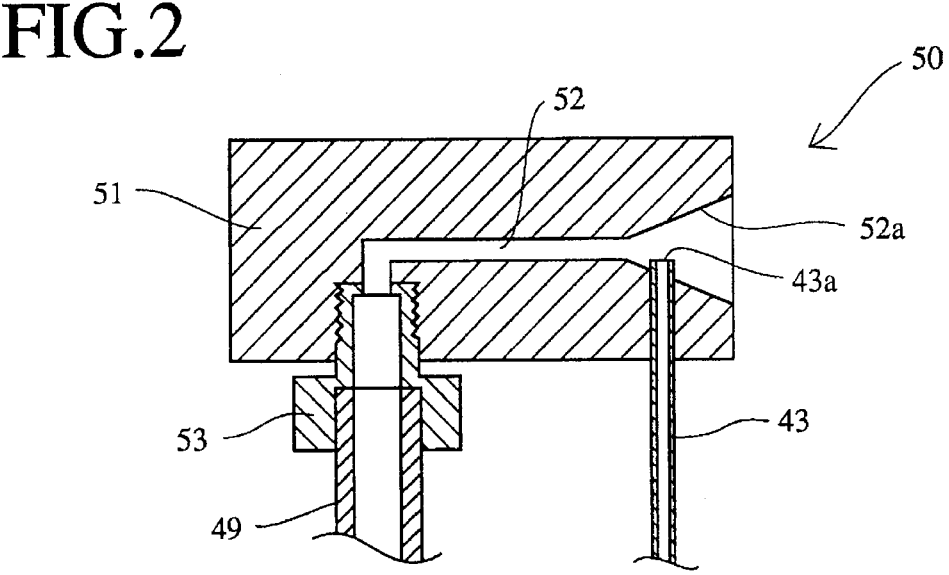
FIG. 2 is an enlarged partial cross-sectional view showing the details of a nozzle in the exhaust gas-cleaning apparatus in FIG. 1.

FIG. 2 shows the details of the spray nozzle 50. The spray nozzle 50 comprises a nozzle body 51 having a central bore 52 for supplying the compressed air, and a joint 53 threaded into an inlet opening of the central bore 52 for connecting the pipe 49 to the nozzle body 51. An outlet opening 52a of the central bore 52 is in a funnel shape having a diameter increasing gradually from inside to outside. Disposed in the outlet opening 52a is an outlet opening 43a of the liquid hydrocarbon supply pipe 43, in such a manner that the pipe 43 is substantially perpendicular to the air stream flowing from the central bore 52.

When the compressed air is ejected from the nozzle body 51 through the central bore 52, negative pressure is generated near the outlet opening 43a of the liquid hydrocarbon supply pipe 43, whereby the liquid hydrocarbon 55 is sucked from the store tank 42 up to the nozzle 50, and atomized in the funnel-shaped outlet opening 52a. Thus, the liquid hydrocarbon is introduced into the exhaust gas in an atomized state by a spray principle. In this case, it is important to control the pressure of the liquid hydrocarbon-storing tank 42 such that the pressure in a space above the liquid hydrocarbon 55 in the tank 42 is substantially equal to that of the exhaust gas in the pipe 2 on the upstream side of the exhaust gas cleaner 3. For this purpose, a pressure means P controllable depending on the pressure of the exhaust gas pipe 2 may be mounted to the tank 42. Alternatively, the exhaust gas pipe 2 and the tank 42 may be pressure-communicated by means of a diaphragm means, etc. By controlling such means, the liquid hydrocarbon 55 can be sprayed with a small amount of the compressed air. This means that the control of the amount of a sprayed liquid hydrocarbon can be easily conducted.

The nozzle 50 is preferably so designed that the liquid hydrocarbon introduced into the exhaust gas pipe 2 is atomized as finely as possible. Although there are differences depending on the type of a hydrocarbon used, it is preferable that the central bore 52 of the nozzle body 51 has an inner diameter of about 0.1–2 mm, and the pressure of the compressed air is 10–980 kpa in the case of diesel oil.

If the temperature of the exhaust gas is lowered near the exhaust gas cleaner 3 due to the compressed air ejected into the exhaust gas, the removing efficiency of the NOx would be reduced. In such a case, it is preferable to heat the compressed air before ejecting into the exhaust gas. The heating of the compressed air may be carried out by any method. For instance, a high-temperature exhaust gas can be used as a heat source for the compressed air. In this case, the compressed air supply pipe 49 is preferably disposed such that it is in contact with the exhaust gas pipe 2. Incidentally, the compressed air ejected into the exhaust gas is preferably at a temperature of about 200°–300° C.

(2) Second Embodiment

Figure 3:
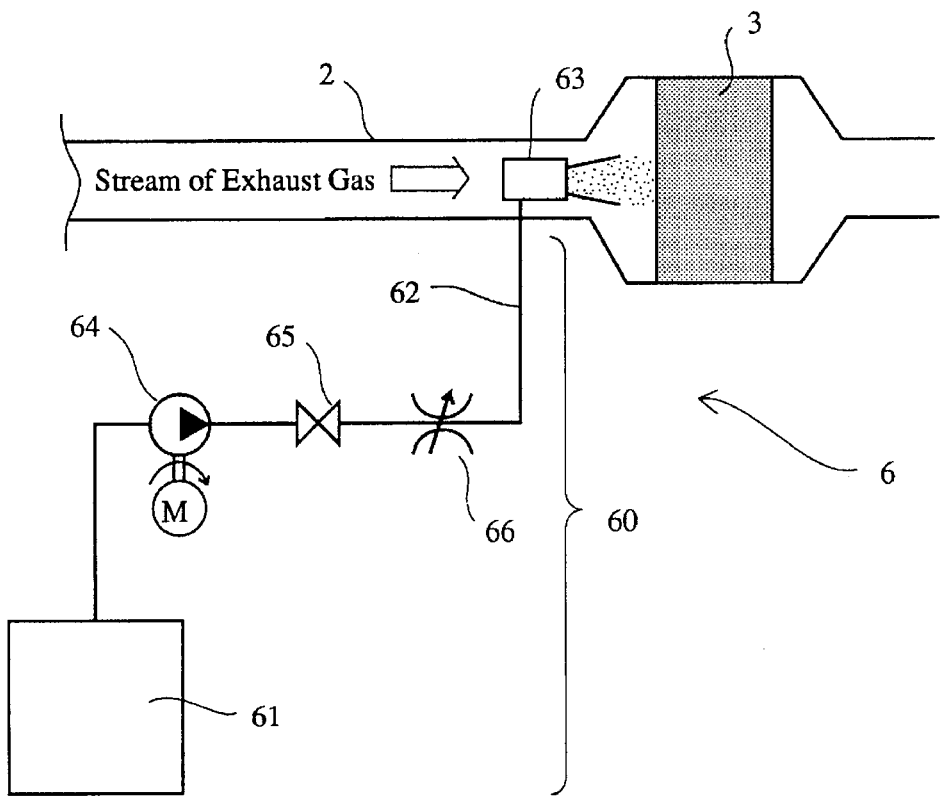
FIG. 3 is a schematic view showing an exhaust gas-cleaning apparatus according to another embodiment of the present invention.

Referring to FIG. 3, the exhaust gas-cleaning apparatus 6 comprises a pipe 2 through which an exhaust gas passes, an exhaust gas cleaner 3 comprising a heat-resistant, porous body disposed in the pipe 2, and a liquid hydrocarbon supply system 60 comprising a spray means 63 disposed in the pipe 2 on the upstream side of the exhaust gas cleaner 3 for spraying a liquid hydrocarbon into a stream of the exhaust gas.

The liquid hydrocarbon supply system 60 comprises a liquid hydrocarbon-storing tank 61, and a liquid hydrocarbon supply pipe 62 communicating with a spray nozzle 63 for introducing the liquid hydrocarbon into the exhaust gas. Disposed in the liquid hydrocarbon supply pipe 62 are a pump 64 for supplying the liquid hydrocarbon to the spray nozzle 63, a throttle valve 65 for controlling the flow rate of the liquid hydrocarbon, and a switch valve 66 for opening or shutting the pipe 62. Instead of the pump 64, a pressure means (not shown) may be mounted to the tank 61 so that the liquid hydrocarbon can be ejected at a proper pressure.

The spray nozzle 63 comprises only one thin flow path (not shown) through which the liquid hydrocarbon passes, and the amount of the liquid hydrocarbon supplied to the spray nozzle 63 is controlled by the throttle valve 65 and the switch valve 66.

In this system shown in FIG. 3, although the air cannot be supplied to the exhaust gas pipe 2, the amount of the liquid hydrocarbon can be controlled accurately. Further, finely atomized liquid hydrocarbon can easily be introduced into the exhaust gas with an appropriate design of a tip end of the spray nozzle 63. This apparatus is particularly suitable when the liquid hydrocarbon is in a gas state in a normal state (1 atom, room temperature).

If the air is to be introduced into the exhaust gas together with the liquid hydrocarbon, an air pipe (not shown) for adding a proper amount of a compressed air to the liquid hydrocarbon may be connected to the liquid hydrocarbon supply pipe 62.

[B] Exhaust Gas Cleaner (a) Heat-Resistant, Porous Body

The exhaust gas cleaner 3 disposed in the exhaust gas-cleaning apparatus 1 comprises a porous body having excellent heat resistance, thermal shock resistance, etc. Such a porous body may be a ceramic filter or a porous metal filter conventionally used for exhaust gas converters. Also, the porous body may be constituted by porous pellets or granules packed in a casing, or heat-resistant fibrous materials packed in a casing. From the aspect of durability, ceramic filters such as foam-type or honeycomb-type ceramic filters and ceramic pellets are preferable. From the aspect of easiness of production, foam-type 15 ceramic filters and ceramic pellets are particularly preferable.

Since the heat-resistant, porous body is exposed to a high-temperature exhaust gas, it is required to have an excellent heat resistance, and particularly an excellent thermal shock resistance. It is also required to have a particulate matter-capturing capacity while causing pressure drop only within the permitted range. Such materials for the heat-resistant, porous bodies include ceramics such as alumina, silica, titania, zirconia and their composites such as silica-alumina, alumina-zirconia, alumina-titania, silica-titania, silica-zirconia, titania-zirconia, mullite, cordierite, etc.

Since NOx in the exhaust gas is reacted with a liquid hydrocarbon which is atomized and gasified or a gaseous hydrocarbon while the exhaust gas is passing through the exhaust gas cleaner, it is preferable that the pressure drop of the exhaust gas in the exhaust gas cleaner is within a permissible range, and that the porous body has a large surface area which is brought into contact with the exhaust gas. In the above respects, it is preferable that the porous body has a porosity of 20–90%. When the porosity of the porous body is less than 20%, the exhaust gas cannot easily pass through the porous body, and a surface area of the porous body is too small to effectively carry out the reduction reaction of NOx. On the other hand, when the porosity of the porous body exceeds 90%, the porous body has a poor mechanical strength, and the exhaust gas passes through the porous body too easily, also decreasing the removal ratio of NOx. The preferred porosity of the porous body is 40–80%.

In the case of using a foam-type ceramic filter as a porous body, the foam-type ceramic filter preferably has an average pore diameter of 30–800 μm, preferably 200–400 μm. Incidentally, when the pore size of the foam-type ceramic filter exceeds 1000 μm, the surface area of the foam-type ceramic filter brought into contact with the exhaust gas becomes small, leading to low NOx reduction efficiency.

The foam-type ceramic filter may preferably be produced by a method disclosed by WO 89/05285. A foamable ceramic composition used in this method comprises an aqueous mixture of effective amounts of an alkali metal silicate, an alkali metal aluminate, refractory ceramic materials, viscosity-modifying and gel-strengthening agent, surfactant and metal powder, whereby the alkali metal silicate and the alkali metal aluminosilicate hydrogel which serves as a binder to set the composition in the molded shape, and wherein the metal powder is present in an amount effective to react with alkali materials in the composition so as to produce, as a by-product of such reaction, hydrogen gas which, in conjunction with the surfactant, develops in the composition a significant degree of porosity prior to the setting of the hydrogel.

Incidentally, when the foam-type ceramic filter is used for an exhaust gas cleaner, it may be constituted by a low-density portion formed with a high-density, thin-layer portion at one end of the filter, particularly on the outlet side, as long as pressure drop is within a permissible range. Here, the low-density portion means a porous portion having the above-described porosity, and the high-density, thin-layer portion has a porosity of 40–85% and a pore size of about 3–800 μm (average: 20–300 μm). From the aspect of pressure drop, the thickness of the high-density, thin-layer portion is preferably 0.2–2 mm.

The high-density, thin-layer portion can be formed on one side (corresponding to the outlet side) of the heat-resistant, porous foam-type ceramic filter by the following methods:

(a) A slurry of a ceramic foam material such as cordierite is poured into a mold having a desired shape whose bottom surface is coated with a parting agent comprising glycerin, water and a surfactant, and the resulting molded product is removed from the mold, dried and then sintered.

(b) A uniform ceramic body is first formed, and one surface of the body is coated with a mixture of ceramic powder such as cordierite and an organic binder. The resulting composite body is dried and then sintered.

Since the filter is required to have a practically sufficient strength, the above ceramic filter is subjected to burning at a temperature of 1000° C. or higher.

By using the foam-type ceramic filter constituted by the low-density portion and the high-density, thin-layer portion, high efficiency of cleaning an exhaust gas can be achieved, because the exhaust gas is likely to enter into fine pores of the filter due to proper resistance (pressure increase) caused by the high-density, thin-layer portion located on the downstream side.

(b) Porous Ceramic Powder Layer

To carry out the removal of NOx from the exhaust gas effectively, the surface area of the porous body such as a ceramic filter for the exhaust gas cleaner is preferably as large as possible. For the purpose of increasing the surface area of the porous body, it is preferable that the porous body is coated with a porous ceramic powder layer. The porous ceramic powder layer may be made of a porous ceramic material having a large surface area such as titania ($TiO_2$), alumina, zirconia, silica, magnesia, titania-alumina, alumina-zirconia, alumina-silica, titania-silica, titania-zirconia, etc. To obtain higher NOx reduction effect, the porous ceramic powder layer is preferably made of alumina, zirconia, titania, titania-zirconia, etc.

In general, the porous ceramic powder layer formed on the porous body preferably has a BET specific surface area of 2 $m^2/g$ or more. When the BET specific surface area of the porous ceramic powder layer is less than 2 $m^2/g$, remarkable improvement of the removal ratio of NOx cannot be achieved. Incidentally, the upper limit of the BET specific surface area of the porous ceramic powder is practically about 400 $m^2/g$ for technical reasons. Therefore, the range of the BET specific surface area of the porous ceramic powder layer is 2–400 $m^2/g$. Incidentally, when alumina or alumina-containing oxides are used, the BET specific surface area of the porous ceramic powder layer is preferably 100 $g/m^2$ or more and up to 400 $m^2/g$, and when titania or titania-containing oxides are used, the BET specific surface area of the porous ceramic powder layer is preferably 20 $g/m^2$ or more and up to 400 $m^2/g$.

The thickness of the porous ceramic powder layer formed on the porous body is preferably 50 μm or less. By this thickness, it is not likely that the porous ceramic powder layer peels off from the porous body by thermal shock in the exhaust gas-cleaning operation.

The amount of the porous ceramic powder layer is almost proportional to the thickness thereof. In general, the amount of the porous ceramic powder layer is 5–20 parts by weight per 100 parts by weight of the porous body. When the amount of ceramic carrier powder is less than 5 parts by weight, a sufficiently large surface area cannot be obtained, and the ceramic carrier layer cannot support a sufficient amount of the catalyst. On the other hand, when the amount of the ceramic powder exceeds 20 parts by weight, the pressure drop in the exhaust gas cleaner becomes too high. The preferred amount of the ceramic powder is 10–15 parts by weight.

The porous ceramic powder layer is formed on the filter by a wash-coating method, a sol-gel method, etc.

In the wash-coating method, the porous body is immersed in a slurry of the above porous ceramic carrier material and dried so that a carrier powder layer is formed on the porous body.

The sol-gel method comprises hydrolyzing organic salts (for instance, alkoxides) of the ceramic carrier-constituting metals; applying the resulting sol to the porous body; bringing the coated porous body into contact with water vapor, etc. to form a layer composed of colloidal particles; and drying and burning it to convert it to a carrier layer for the catalyst. For instance, when catalytic metals are to be supported by a titania ($TiO_2$) carrier layer, a solution of Ti alkoxide (for instance, $Ti(O-isoC_3H_7)_4$) in alcohol is mixed with an acid such as $CH_3COOH$, $HNO_3$, HCl, etc. to prepare a coating solution, and the porous body is immersed in the coating solution. After removing the porous body from the coating solution, it is reacted with vapor or water to cause gelation. After drying and burning, a thin titania coating is formed on a porous surface of the porous body. In the sol-gel method, the acid serves as a hydrolysis catalyst in the course of gelation. However, alkalis may be added in place of the acids to conduct the hydrolysis reaction.

Although the above explanation has been made with respect to the case of using titania as a ceramic carrier material, any other ceramics may be similarly used to support the catalyst by the sol-gel method. For instance, in the case of supporting the catalytic components by alumina, the same methods as above may be used except for using alkoxides of Al. Other porous carriers may be used in the same manner as above.

The ceramic powder layer having a large surface area coated on the porous body functions to increase a surface area of the porous body capable of being in contact with the exhaust gas, whereby the reaction of NOx and the hydrocarbon added thereto takes place effectively. Also, a reaction temperature range for the above reaction is widened, making it possible to conduct the reduction of NOx more stably.

Incidentally, in the case of porous ceramic pellets, the ceramic powder layer is usually omitted and the pellets are made of the same ceramics as those for the ceramic powder layer.

(c) Catalysts

The catalysts usable in the present invention may be various combinations of alkali metal elements, transition elements and rare earth elements. Specifically, the following five types of catalysts can be used.

(1) First Catalyst (a) at least one of alkali metal elements;

(b) at least one of elements selected from the group consisting of transition elements in Groups IB, IIB, VB, VIB, VIIB and VIII of the Periodic Table, and Sn, and (c) at least one of rare earth elements.

(2) Second Catalyst (a) at least one of alkali metal elements; and (b) at least one of elements selected from the group consisting of Cu, Co, Mn and V.

(3) Third Catalyst (b) at least one of elements selected from the group consisting of Cu, Co, Mn and V; and (c) at least one of rare earth elements.

(4) Fourth Catalyst (b) at least one of elements selected from the group consisting of Cu, Co, Mn and V.

Detailed explanations will be made below with respect to each catalyst.

(1) First Catalyst

Alkali metal elements

The alkali metal element (a) is preferably selected from Na, K and Cs. Particularly when Cs is used, hydrocarbons can be reacted with NOx efficiently. This is due to the fact that the presence of Cs serves to increase the selectivity of the reaction of the hydrocarbons with NOx, thereby reducing the reaction between the hydrocarbons and oxygen present in the exhaust gas.

The amount of the component (a), measured as an alkali metal itself (active species), is 10–50 weight % based on the total weight of the catalyst (on a metal basis). When the amount of the alkali metal element is less than 10 weight % or more than 50 weight %, the efficiency of the catalyst to remove NOx is low. The preferred amount of the alkali metal element is 15–40 weight %.

Transition metal elements, etc.

The components (b) (transition metal elements, etc. ) consist of elements in Groups IB, IIB, VB (V, Nb, Ta), VIB (Cr, Mo, W), VIIB (Mn, Re) and VIII (Fe, Co, Ni) of the Periodic Table, and Sn. Preferable elements in these groups are as follows:

Cu: Group IB,

Zn: Group IIB,

V: Group VB,

Mo: Group VIB,

Mn: Group VIIB, and

Co: Group VIII.

The component (b) is preferably at least one of Cu, Co, Mn and V, and more preferably a combination of V and at least one of Cu, Co and Mn. In this combination, a weight ratio of at least one of Cu, Co and Mn to V is preferably about $5/1$–$1/15$. When the weight ratio is more than $5/1$ or less than $1/10$, the effect of stabilizing the catalytic activity for a long period of time is not sufficiently obtained. The preferred weight ratio of at least one of Cu, Co and Mn to V is $3/1$–$1/10$.

The amount of the component (b), measured as a metal itself (active species), is 15–65 weight % based on the total weight of the catalyst (on a metal basis). When the amount of the components (b) is less than 15 weight % or more than 65 weight %, the reaction of hydrocarbon with NOx is reduced. The preferred amount of the component (b) is 20–50 weight %.

Rare earth elements

The rare earth elements (c) are preferably Ce, La, Nd, Sm, Pr, etc., and Misch metal which is a mixture of rare earth elements may be used as the rare earth elements.

The amount of the component (c), measured as a metal itself (active species), is 10–50 weight % based on the total weight of the catalyst (on a metal basis). When the amount of the rare earth element is less than 10 weight % or more than 50 weight %, the efficiency of the catalyst to remove NOx is low. The preferred amount of the rare earth element is 15–40 weight %.

Amount of catalyst

The amount of the catalyst (total amount of (a)+(b)+(c) as metallic active components) is generally 0.05–15 weight % based on the ceramic powder layer. When the amount of the catalyst is less than 0.05 weight %, sufficient effect of the catalyst cannot be obtained. On the other hand, when the amount of the catalyst is more than 15 weight %, the hydrocarbon tends to remain in the exhaust gas discharged to the atmosphere. The preferred amount of the catalyst is 0.1–15 weight %, particularly 0.1–3 weight % based on the ceramic powder layer.

Method of applying catalyst

The first catalyst may be applied to the porous body directly by an immersion method, a precipitation method, etc., or indirectly via the above ceramic powder layer.

In the impregnation method, the catalyst is supported by the heat-resistant, porous body by immersing the porous body in aqueous solutions of carbonates, nitrates, acetates, chlorides, hydroxides, etc. of catalyst-forming metals. In addition, the porous body may be immersed in solutions of compounds containing a plurality of base metals such as alkali ferrocyanide, etc.

In the precipitation method, a ceramic carrier supporting a catalyst is produced by mixing aqueous solutions of nitrates, etc. of metal elements constituting the ceramic carrier with aqueous solutions of metal salts for the catalyst, and coprecipitating them by a known method.

The catalyst may be supported by a carrier layer formed on the porous body by a wash-coating method, a sol-gel method, etc.

In the wash-coating method, the porous body is immersed in a slurry of the above porous carrier material and dried so that a carrier layer is formed on the porous body. To support the catalyst by a carrier layer, there are two methods available: (1) a method of applying the catalyst by impregnation or precipitation to the carrier layer wash-coated on the porous body, and (2) a method of forming a catalyst-supporting carrier layer on the porous body by wash-coating the porous body with a suspension of catalytic components-containing ceramic powder. According to the latter method (2), the catalyst-supporting carrier layer can be formed by a single step.

In the sol-gel method, either one of the following two procedures can be conducted.

The first sol-gel method comprises hydrolyzing organic salts (for instance, alkoxides) of the ceramic carrier-constituting metals; applying the resulting sol to the porous body; bringing the coated porous body into contact with water vapor, etc. to form a layer composed of colloidal particles; drying and burning it to convert it to a carrier layer for the catalyst; and applying the catalyst to the carrier layer. For instance, when catalytic metals are to be supported by a titania ($TiO_2$) carrier layer, a solution of Ti alkoxide (for instance, $Ti(O-isoC_3H_7)_4$) in alcohol is mixed with an acid such as $CH_3COOH$, $HNO_3$, HCl, etc. to prepare a coating solution, and the ceramic body is immersed in the coating solution. After removing the porous body from the coating solution, it is reacted with vapor or water to cause gelation. After drying and burning, a thin titania coating is formed on a porous surface of the porous body. Next, the coated porous body is impregnated with aqueous solutions of carbonates, nitrates, acetates, hydroxides, etc. of catalytic components; and the impregnated layer is dried and burned on the porous body.

In the second sol-gel method, the ceramic carrier materials and the catalytic components are simultaneously applied to the porous body. For instance, a solution of Ti alkoxide in alcohol is mixed with an acid such as $CH_3COOH$, $HNO_3$, HCl, etc. and an aqueous solution of catalytic component metal salts to prepare a coating solution, and the porous body is immersed in the coating solution. After removing the porous body from the coating solution, it is reacted with vapor or water to prepare a sol, which is then converted to a gel. The gel is dried and then burned to provide a catalyst-supporting ceramic carrier.

By using the sol-gel method, the catalyst can be extremely uniformly dispersed in the porous body, leading to an increase in catalytic activity.

In the sol-gel method, the acid serves as a hydrolysis catalyst in the course of gelation. However, alkali metals may be added in place of the acids to conduct the hydrolysis reaction.

The catalytic metal salts may be of any type, as long as they are soluble in water, including carbonates, nitrates, acetates, hydroxides, etc. In addition, for the purpose of uniformly dispersing catalyst metal salts in an alkoxide solution in alcohol, a dispersing agent such as ethylene glycol, etc. is preferably added.

(2) Second Catalyst
Alkali metal elements

The alkali metal element (a) is preferably selected from Na, K and Cs. Particularly when Cs is used, hydrocarbons can be reacted with NOx efficiently for the reason as described in the column of the first catalyst.

The amount of the component (a), measured as an alkali metal itself (active species), is 10–50 weight % based on the total weight of the catalyst (on a metal basis). When the amount of the alkali metal element is less than 10 weight % or more than 50 weight %, the reactivity of hydrocarbons with NOx is low. The preferred amount of the alkali metal element is 20–40 weight %.

Transition metal elements

The transition metal element (component (b)) is at least one of Cu, Co, Mn and V. More preferably, it is a combination of V and at least one of Cu, Co and Mn. In this combination, a weight ratio of at least one of Cu, Co and Mn to V is preferably about 5/1–1/15. When the weight ratio is more than 5/1 or less than 1/15, the effect of stabilizing the catalytic activity for a long period of time is not sufficiently obtained. The preferred weight ratio of at least one of Cu, Co and Mn to V is 3/1–1/10.

The amount of the component (b), measured as a metal itself (active species), is 50–90 weight % based on the total weight of the catalyst (on a metal basis). The preferred amount of the component (b) is 60–80 weight %.

Other catalyst components

The second catalyst may contain, in addition to the components (a) and (b), a rare earth element (c) such as Ce, La, Nd, Sin, Pr, etc., and Misch metal which is a mixture of rare earth elements may be used as the rare earth elements.

When the rare earth element (c) is added, the amounts of the components (a), (b) and (c) are as follows: (a) 5–50 weight %, (b) 30–80 weight %, and (c) 50 weight % or less. Without these ranges, high reactivity of hydrocarbon with NOx cannot be achieved. Preferably, (a) 10–30 weight %, (b) 40–70 weight %, and (c) 10–30 weight %.

Amount of catalyst

The amount of the catalyst (total amount of (a)+(b) (+(c), if any) as metallic active components) is generally 0.05–15 weight % based on the ceramic powder layer. When the amount of the catalyst is less than 0.05 weight %, sufficient effect of the catalyst cannot be obtained. On the other hand, when the amount of the catalyst is more than 15 weight %, the hydrocarbon tends to remain in the exhaust gas discharged to the atmosphere. The preferred amount of the catalyst is 0.1–15 weight %, particularly 0.1–3 weight % based on the ceramic powder layer.

Method of applying catalyst

The second catalyst may be applied to the porous body in the same manner as in the case of the first catalyst.

(3) Third Catalyst
Transition metal elements

The transition metal element in the third catalyst is at least one of elements selected from the group consisting of Cu, Co, Mn and V. It is preferable to use a combination of V and at least one of Cu, Co and Mn in order to keep a stable catalytic activity for a long period of time.

The amount of the component (b), measured as a metal itself (active species), is 40–90 weight % based on the total weight of the catalyst (on a metal basis). When the amount of the component (b) is less than 40 weight % or more than 90 weight %, the catalytic activity of causing the hydrocarbon to react with NOx is low. The preferred amount of the component (b) is 50–80 weight %.

In the case of a combination of V and at least one of Cu, Co and Mn, a weight ratio of at least one of Cu, Co and Mn to V is preferably about 5/1–1/10. When the weight ratio is more than 5/1 or less than 1/10, the catalytic activity is not stabilized for a long period of time. The preferred weight ratio of at least one of Cu, Co and Mn to V is 3/1–1/5.

Rare earth elements

The rare earth elements (c) may be the same as in the first catalyst. The amount of the component (c), measured as a metal itself (active species), is 10–60% based on the total weight of the catalyst (on a metal basis) for the same reason as described above in connection with the component (b). The preferred amount of the rare earth element is 20–50 weight %.

Amount of catalyst

The amount of the catalyst (total amount of (b)+(c)) is preferably 0.5–15 weight % (as metallic active components) based on the porous ceramic body, regardless of whether or not the porous ceramic powder layer is formed on the the porous ceramic body. In this case, the porous ceramic body is made of the same ceramic material as that of the above-described porous ceramic powder layer. When the amount of the catalyst is less than 0.5 weight %, the reaction of hydrocarbon with NOx is insufficient. On the other hand, when the amount of the catalyst exceeds 15 weight %, the hydrocarbon is burned without being reacted with NOx. The preferred amount of the catalyst is 5–15 weight %.

Incidentally, since the reactivity of the hydrocarbon with NOx changes depending on the types of the hydrocarbon, it is important to adjust the amount of the catalyst depending on the types of the hydrocarbon. In general, in the case of using a stable hydrocarbon, a relatively large amount of the catalyst is used. On the other hand, in the case of using a relatively unstable hydrocarbon, a small amount of the catalyst is used.

Method of applying catalyst

The third catalyst may be applied to the porous body in the same manner as in the case of the first catalyst.

(4) Fourth Catalyst

Transition metal elements

The transition metal element (component (b)) is at least one of Cu, Co, Mn and V. More preferably, it is a combination of V and at least one of Cu, Co and Mn. In this combination, a weight ratio of at least one of Cu, Co and Mn to V is preferably about 5/1–1/15. When the weight ratio is more than 5/1 or less than 1/15, the effect of stabilizing the catalytic activity for a long period of time is not sufficiently obtained. The preferred weight ratio of at least one of Cu, Co and Mn to V is 3/1–1/10.

Other catalyst components

The fourth catalyst may contain, in addition to the component (b), an alkali metal element (a) such as Na, K and Cs, and a rare earth element (c) such as Ce, La, Nd, Sm, Pr, etc. Misch metal which is a mixture of rare earth elements may be used as the rare earth elements.

When the alkali metal element (a) is added, the amounts of the alkali metal element (a) is 20 weight % or less.

When the rare earth element (c) is added, the amounts of the rare earth element (c) is 50 weight % or less, preferably 40 weight % or less.

When both the alkali metal element (a) and the rare earth element (c) are added, the amounts of the components (a), (b) and (c) are as follows: (a) 0–20 weight %, (b) 30–95 weight %, and (c) 0–50 weight % or less. Preferably, (a) 0–20 weight %, (b) 40–90 weight %, and (c) 0–40 weight % or less.

Amount of catalyst

The amount of the catalyst is generally 5–20 weight based on the porous ceramic body, because the porous ceramic powder layer is not formed on the the porous ceramic body. In this case, the porous ceramic body is made of the same ceramic material as that of the above-described porous ceramic powder layer. When the amount of the catalyst is less than 5 weight %, sufficient effect of the catalyst cannot be obtained. On the other hand, when the amount of the catalyst is more than 20 weight %, the removal ratio of NOx is rather decreased. The preferred amount of the catalyst is 5–15 weight %.

Method of applying catalyst

The fourth catalyst may be applied to the porous body in the same manner as in the case of the first catalyst.

[2] Method of Cleaning Exhaust Gas

[A] First Method

The first method of cleaning the exhaust gas will be explained with the exhaust gas-cleaning apparatus shown in FIG. 1. In the first method, the exhaust gas cleaner 3 is disposed in the exhaust gas pipe 2 connected to an outlet of an engine, and the hydrocarbon is sprayed into a stream of the exhaust gas on the upstream side of the exhaust gas cleaner.

The catalyst which may be used in this method is preferably the first catalyst.

The hydrocarbon used in the first method is a hydrocarbon which is in a liquid state under a normal condition (room temperature and 1 atom). Its boiling point is about 90° C.–about 350° C. Specific examples of such hydrocarbons are diesel oil, cetane, heptane, etc. When a hydrocarbon having a boiling point exceeding about 450° C. is added, it is not easily evaporated at an exhaust gas temperature under a normal operation condition, failing to accelerate the reduction of NOx. For safety operation, the upper limit of the boiling temperature of the hydrocarbon is set at about 350° C. Preferably, a hydrocarbon having a boiling point of 160°–340° C. is used. Such a hydrocarbon is typically diesel oil for a practical reason.

The amount of the liquid hydrocarbon added is properly determined depending on the amount of NOx in the exhaust gas. For this purpose, the switch valve 46 and the throttle valve 47 are adjusted to control the pressure and flow rate of the compressed air. Specifically, a weight ratio of the liquid hydrocarbon to NOx in the exhaust gas is 0.2–3. When the weight ratio of the liquid hydrocarbon to NOx is less than 0.2, sufficient effect of adding the liquid hydrocarbon cannot be obtained. On the other hand, when the weight ratio of the liquid hydrocarbon to NOx is more than 3, an excess liquid hydrocarbon remains in the exhaust gas discharged to the atmosphere.

In general, as the pressure of the compressed air increases, the amount of the sprayed liquid hydrocarbon increases. Accordingly, by controlling the pressure of the compressed air accumulator 45, the amount of the liquid hydrocarbon introduced into the exhaust gas can be adjusted. Also, even if the pressure of the compressed air is kept constant, the amount of the liquid hydrocarbon can be adjusted by controlling the throttle valve 47. Therefore, by controlling both pressure and flow rate of the compressed air, the amount of the liquid hydrocarbon and air introduced into the exhaust gas (thus, oxygen content in the exhaust gas) can be adjusted.

The temperature of the exhaust gas in the apparatus (precisely speaking, the temperature of the exhaust gas passing through the exhaust gas cleaner 3) should be 200°–600° C., though it may be changed to some extent depending on the type (boiling point) of the hydrocarbon used. When the temperature of the exhaust gas is lower than 200° C., effective reduction of NOx cannot be achieved. On the other hand, when the temperature of the exhaust gas is higher than 600° C., the liquid hydrocarbon added is burned so that a reaction of forming carbon dioxide and water predominantly takes place, leading to a poor reduction ratio of NOx. The preferred temperature of the exhaust gas in the apparatus is 250°–550° C.

Incidentally, since the measurement of the temperature of the exhaust gas in the exhaust gas cleaner is often very difficult, the temperature of the exhaust gas in the exhaust gas pipe 2 slightly upstream of the exhaust gas cleaner 3 may be measured and used as a substitute for the temperature of the exhaust gas in the exhaust gas cleaner 3.

In an actual engine operation, the temperature of an exhaust gas discharged from the engine may change from time to time depending on driving conditions. Accordingly, to ensure high-efficiency cleaning of the exhaust gas, the temperature of the exhaust gas is preferably adjusted within the above range. One example of such a control is shown below. First, a valve for controlling the flow rate of the exhaust gas and a means for sensing the temperature of the exhaust gas are mounted in the exhaust gas pipe 2 at positions upstream of the exhaust gas cleaner, and the flow rate control valve is throttled whenever the temperature of the exhaust gas becomes lower than the lower limit of the above range, to increase the temperature of the exhaust gas. Oppositely, in the case of lowering the temperature of the exhaust gas, the flow rate control valve is opened.

[B] Second Method

The second method may be conducted by using the apparatuses shown in FIGS. 1–3. The liquid hydrocarbon may be sprayed into the exhaust gas.

The catalyst which may be used in this method is preferably the second catalyst.

The hydrocarbon used in the second method may be the same liquid hydrocarbon as in the first method. A weight ratio of the liquid hydrocarbon to NOx in the exhaust gas is 0.2–3 as in the first method.

The temperature of the exhaust gas passing through the exhaust gas cleaner is 200°–600° C., preferably 250°–550° C. The control of the temperature of the exhaust gas can be conducted in the same way as in the first method.

[C] Third Method

The third method may be conducted by using the apparatuses shown in FIGS. 1–3.

The catalyst which may be used in this method is preferably the third catalyst.

The hydrocarbon introduced into the exhaust gas are (i) alkines and alkenes having a carbon number of 2 or more, such as acetylene, propylene, butene, etc., (ii) alcohols having a carbon number of 2 or more, such as ethanol, propanol, butanol, etc., and (iii) liquid hydrocarbon such as kerosine, diesel oil, etc.

The amount of the hydrocarbon introduced into the exhaust gas is preferably set such that a weight ratio of the hydrocarbon to NOx in the exhaust gas is 0.2–5. When this ratio is less than 0.2, sufficient effect of adding the hydrocarbon cannot be obtained. On the other hand, when this ratio exceeds 5, an excess liquid hydrocarbon remains in the exhaust gas discharged to the atmosphere.

In the case of liquid hydrocarbon, it is preferably sprayed into the exhaust gas by means of the apparatuses shown in FIGS. 1–3. In the case of gaseous hydrocarbon, it may be introduced by means of the apparatus shown in FIG. 3.

The temperature of the exhaust gas passing through the exhaust gas cleaner should be 200°–600° C., though it may be changed to some extent depending on the type (boiling point) of the hydrocarbon used. When the temperature of the exhaust gas is lower than 200° C., sufficient gasification of the hydrocarbon cannot be achieved, so that NOx is not effectively reduced. On the other hand, when the temperature of the exhaust gas is higher than 600° C., the hydrocarbon added is burned so that a reaction of forming carbon dioxide and water predominantly takes place, leading to a poor reduction ratio of NOx. The preferred temperature of the exhaust gas in the apparatus is 250°–550° C.

Specifically, in the case of propylene, the temperature of the exhaust gas passing through the exhaust gas cleaner is 300°–550° C. In the case of ethanol, the temperature of the exhaust gas is 200°–500° C. And in the case of diesel oil, the temperature of the exhaust gas is 300°–500° C.

The control of the temperature of the exhaust gas can be conducted in the same way as in the first method.

[D] Fourth Method

The fourth method may be conducted by using the apparatuses shown in FIGS. 1–3.

The catalyst which may be used in this method is preferably the fourth catalyst.

The hydrocarbon introduced into the exhaust gas are alkines such as acetylene, etc. alkenes such as propylene, butene, etc., alkanes having a carbon number of 3 or more such as propane, etc.

The amount of the hydrocarbon introduced into the exhaust gas is preferably set such that a weight ratio of the hydrocarbon to NOx in the exhaust gas is 0.2–5. When this ratio is less than 0.2, sufficient effect of adding the hydrocarbon cannot be obtained. On the other hand, when this ratio exceeds 5, an excess liquid hydrocarbon remains in the exhaust gas discharged to the atmosphere.

The temperature of the exhaust gas passing through the exhaust gas cleaner should be 200°–600° C., though it may be changed to some extent depending on the type (boiling point) of the hydrocarbon used. The preferred temperature of the exhaust gas in the apparatus is 250°–550° C. to remove the hydrocarbon together with particulate. Specifically, in the case of propylene, the temperature of the exhaust gas passing through the exhaust gas cleaner may be 250°–500° C.

The control of the temperature of the exhaust gas can be conducted in the same way as in the first method.

This method is particularly advantageous when the exhaust gas flows at a high space velocity. In this case, the exhaust gas is brought into contact with the exhaust gas cleaner for a very short period of time. For describing this, the term "contact time" is used. The contact time of the exhaust gas is defined as time within which 1 ml (converted to amount at a normal condition of a room temperature and 1 atom) of the exhaust gas is in contact with 1 gram of the catalyst on the exhaust gas cleaner Thus, the unit of the contact time is sec.·g/ml. In this method, the contact time of the exhaust gas is 0.15 sec.·g/ml or less.

Even at such a high space velocity, the reduction reaction of NOx takes place efficiently because the hydrocarbon introduced into the exhaust gas and NOx are effectively reacted on the catalyst having the above composition.

[E] Fifth Method

The fifth method may be conducted by using the apparatuses shown in FIGS. 1–3.

The catalyst which may be used in this method is preferably the fourth catalyst.

The hydrocarbon introduced into the exhaust gas are alkines, alkenes and alkanes which are liquid in a normal state, diesel oil, alcohols. Those having boiling points of about 90° C.–about 350° C. such as diesel oil, cetane, heptane, etc. are preferable.

According to the inventors' research, it has been found that hydrocarbons having larger carbon numbers are more effective than those having smaller carbon numbers, and that among hydrocarbons having the same carbon numbers, those having double bonds or triple bonds are more effective.

In this method, the liquid hydrocarbon may be sprayed into the exhaust gas.

The amount of the hydrocarbon introduced into the exhaust gas is preferably set such that a weight ratio of the hydrocarbon to NOx in the exhaust gas is 0.2–5. When this ratio is less than 0.2, sufficient effect of adding the hydrocarbon cannot be obtained. On the other hand, when this ratio exceeds 5, an excess liquid hydrocarbon remains in the exhaust gas discharged to the atmosphere.

In the case of liquid hydrocarbon, it is preferably sprayed into the exhaust gas by means of the apparatuses shown in FIGS. 1–3. In the case of gaseous hydrocarbon, it may be introduced by means of the apparatus shown in FIG. 3.

The temperature of the exhaust gas passing through the exhaust gas cleaner should be 200°–600° C., though it may be changed to some extent depending on the type (boiling point) of the hydrocarbon used. The preferred temperature of the exhaust gas in the apparatus is 250°–550° C. to remove the hydrocarbon together with particulate.

The control of the temperature of the exhaust gas can be conducted in the same way as in the first method.

This method is also particularly advantageous when the contact time of the exhaust gas is 0.15 sec.·g/ml or less.

Even at such a high space velocity, the reduction reaction of NOx takes place efficiently because the hydrocarbon introduced into the exhaust gas and NOx are effectively reacted on the catalyst having the above composition.

Incidentally, in the above explanations, catalyst components are expressed as metal elements. However, the base metal catalysts usually exist in the form of oxides. Accordingly, please note that K, for instance, is actually in the form of $K_2O$.

Although the above explanation has been made with respect to the case of using alumina or titania as a ceramic carrier material, any other ceramics may be similarly used to support the catalyst. For instance, in the case of supporting the catalytic components by alumina, the same methods as above may be used except for using alkoxides of Al. Other porous carriers may be used in the same manner as above.

The present invention will be described in further detail by way of the following Examples. In each Example and Comparative Example, catalytic components are described simply by metal elements for simplicity, and the amount of each catalyst component is expressed by a weight of a metal component in the catalyst component. For instance, the amount of $Cs_2O$ is expressed by a weight of Cs.

Example 1

An exhaust gas-cleaning apparatus shown in FIG. 1 was produced by using a nozzle 50 having a structure shown in FIG. 2. Here, a nozzle body 51 was made of stainless steel, and a diameter of a central bore was 1.7 mm. An air supply pipe 49 connected to the nozzle body 51 was constituted by a stainless steel pipe having a bore diameter of 4 mm. A liquid hydrocarbon supply pipe 43 connected to the nozzle body 51 was constituted by a stainless steel pipe having a bore diameter of 0.5 mm.

Figure 4:
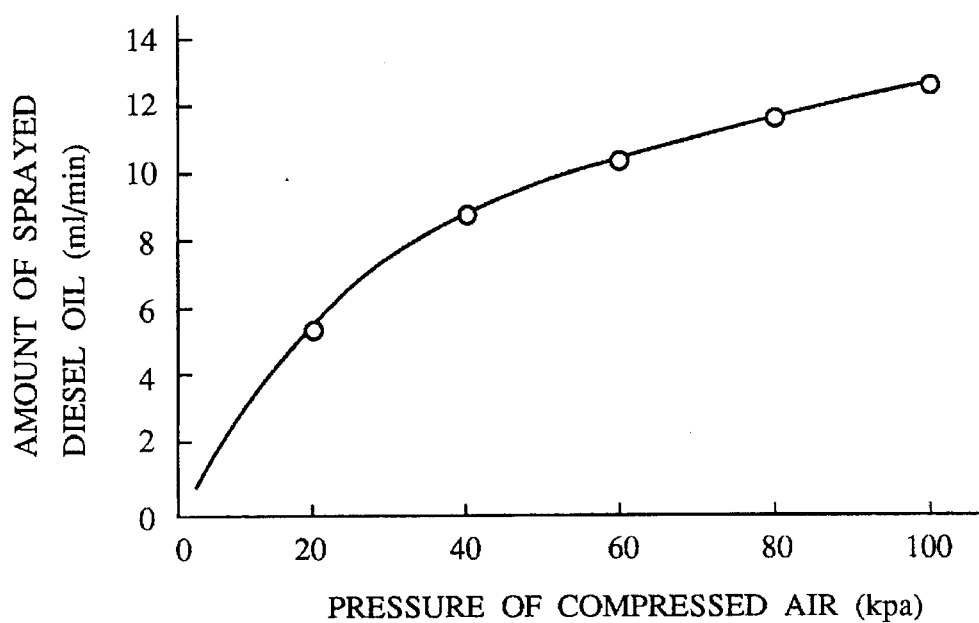
FIG. 4 is a graph showing the relation between the pressure of a compressed air and the amount of sprayed diesel oil.

In the above exhaust gas-cleaning apparatus 1, diesel oil was used as a liquid hydrocarbon and the amount of sprayed diesel oil was measured while changing the pressure of the compressed air. At this time, the difference between a liquid surface level of the diesel oil in the tank 42 and an outlet opening 43a of the liquid hydrocarbon supply pipe 43 was 400 mm. The results of measurement are shown in FIG. 4. As is clear from FIG. 4, as the pressure of the compressed air increases, the amount of sprayed diesel oil increases.

Next, a ceramic foam-type filter made of cordierite (apparent volume: 4 liter, density: 0.45 g/ml, porosity: 50%) was coated with alumina powder in an amount of 10 weight % based on the filter, by a wash-coating method. The resulting coated filter 3 was disposed in an exhaust gas pipe 2 in the exhaust gas-cleaning apparatus shown in FIG. 1. An inlet opening of the pipe 2 was mounted to an outlet of a diesel engine having a displacement of 3.4 liter. The diesel engine was operated at 2000 rpm while increasing an engine load from ¼ to ½ to ¾. Under each operation condition, the concentrations of NOx and oxygen and the temperature of the exhaust gas were measured at an inlet of the exhaust gas cleaner 3. The measurement results are shown in Table 1.

TABLE 1

| Load | NOx Concentration | Oxygen Concentration | Temperature of Exhaust Gas* |
|---|---|---|---|
| ¼ | 360 ppm | 15.5% | 250° C. |
| ½ | 570 ppm | 13.3% | 340° C. |
| ¾ | 650 ppm | 11.0% | 410° C. |

Note *Measured at an inlet of the exhaust gas cleaner.

In the exhaust gas-cleaning apparatus shown in FIG. 1, with a fixed compressed air pressure of 98 kpa, the throttle valve 47 was controlled to change the flow rate of the compressed air, thereby changing the amount of diesel oil sprayed into the exhaust gas pipe 2. Under engine loads of ¼, ½ and ¾, the amount of sprayed diesel oil and the removal ratio of NOx were measured. Here, the removal ratio of NOx is defined as:

(concentration of NOx before treatment—concentration of NOx after treatment)/concentration of NOx before treatment×100%.

The measurement results are shown in Table 2.

TABLE 2

| Load | Amount of Sprayed Diesel oil (ml/minute) | Removal Ratio of NOx (%) |
|---|---|---|
| ¼ | 6 | 9 |
| ¼ | 8 | 14 |
| ¼ | 10 | 20 |
| ½ | 6 | 18 |
| ½ | 8 | 28 |
| ½ | 10 | 40 |
| ¾ | 6 | 30 |
| ¾ | 8 | 40 |
| ¾ | 10 | 50 |

Example 2

In the same exhaust gas-cleaning apparatus as in Example 1, a compressed air supply pipe 49 was arranged such that it was in contact with the exhaust gas pipe 2, to control the temperature of the compressed air ejected from the nozzle 50 to 200°–300° C. Other conditions were the same as in Example 1. Under engine loads of ¼, ½ and ¾, the removal ratio of NOx was measured. The measurement results are shown in Table 3.

TABLE 3

| Load | Amount of Sprayed Diesel oil (ml/minute) | Removal Ratio of NOx (%) |
|---|---|---|
| ¼ | 6 | 10 |
| ¼ | 8 | 16 |
| ¼ | 10 | 23 |
| ½ | 6 | 20 |
| ½ | 8 | 30 |
| ½ | 10 | 44 |
| ¾ | 6 | 34 |
| ¾ | 8 | 46 |
| ¾ | 10 | 60 |

Example 3

An exhaust gas-cleaning apparatus 6 shown in FIG. 3 was produced, with the same exhaust gas pipe 2, exhaust gas cleaner 6 and diesel engine as in Example 1. A nozzle 63 was constituted by a stainless steel pipe having a bore diameter of 4 mm.

Figure 5:
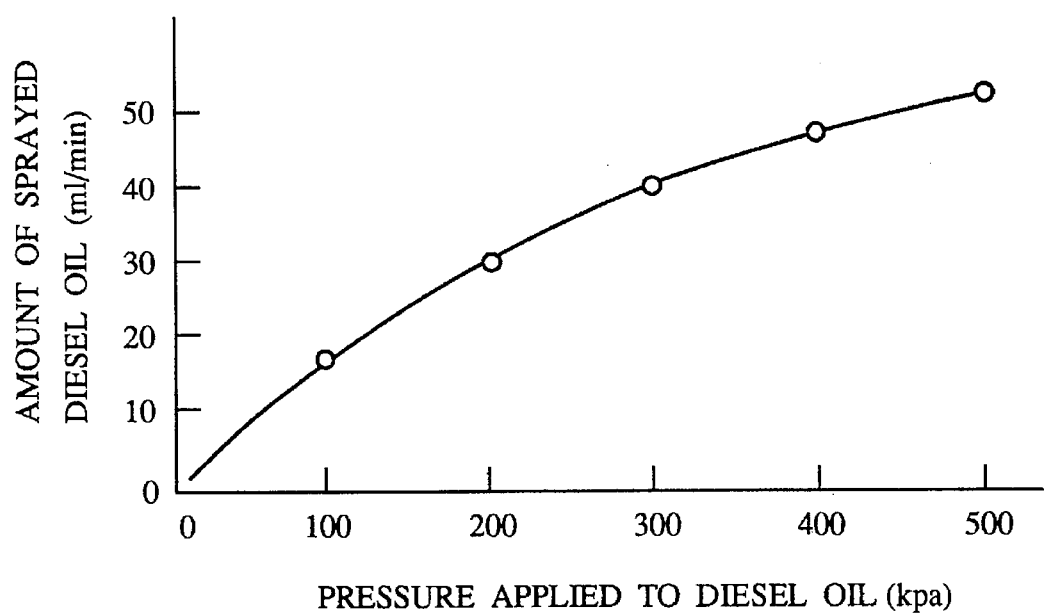
FIG. 5 is a graph showing the relation between the pressure applied to diesel oil and the amount of sprayed diesel oil.

Diesel oil was used as a liquid hydrocarbon, and the amount of diesel oil was measured at a liquid pressure (pressure applied to diesel oil) of 100–500 kpa in the above exhaust gas-cleaning apparatus 6. The measurement results are shown in FIG. 5.

Next, under engine loads of ¼, ½ and ¾, the removal ratio of NOx was measured. The measurement results are shown in Table 4.

TABLE 4

| Load | Amount of Sprayed Diesel oil (ml/minute) | Removal Ratio of NOx (%) |
|---|---|---|
| ¼ | 10 | 15 |
| ¼ | 20 | 32 |
| ¼ | 30 | 42 |
| ½ | 10 | 36 |
| ½ | 20 | 50 |
| ½ | 30 | 60 |
| ¾ | 10 | 42 |
| ¾ | 20 | 55 |
| ¾ | 30 | 70 |

Example 4

The same exhaust gas-cleaning apparatus as in Example 1 except for an exhaust gas cleaner 3 was used, and an exhaust gas pipe 2 was connected to the same diesel engine as in Example 1. The exhaust gas cleaner 3 used in this Example was constituted by a ceramic foam-type filter made of cordierite of Example 1 coated with alumina powder in an amount of 15 weight % based on the filter, by a sol-gel method.

With this exhaust gas-cleaning apparatus, the removal ratio of NOx was measured under the same conditions as in Example 1. The measurement results are shown in Table 5.

TABLE 5

| Load | Amount of Sprayed Diesel oil (ml/minute) | Removal Ratio of NOx (%) |
|---|---|---|
| ¼ | 6 | 24 |
| ¼ | 8 | 28 |
| ¼ | 10 | 33 |

TABLE 5-continued

| Load | Amount of Sprayed Diesel oil (ml/minute) | Removal Ratio of NOx (%) |
|---|---|---|
| ½ | 6 | 30 |
| ½ | 8 | 45 |
| ½ | 10 | 56 |
| ¾ | 6 | 45 |
| ¾ | 8 | 55 |
| ¾ | 10 | 65 |

Example 5

In the same exhaust gas-cleaning apparatus as in Example 4, a compressed air supply pipe was arranged such that it was in contact with the exhaust gas pipe 2, to control the temperature of the compressed air ejected from the nozzle to 200°–300° C. Other conditions were the same as in Example 4. Under engine loads of ¼, ½ and ¾, the removal ratio of NOx was measured. The measurement results are shown in Table 6.

TABLE 6

| Load | Amount of Sprayed Diesel oil (ml/minute) | Removal Ratio of NOx (%) |
|---|---|---|
| ¼ | 6 | 26 |
| ¼ | 8 | 30 |
| ¼ | 10 | 35 |
| ½ | 6 | 32 |
| ½ | 8 | 48 |
| ½ | 10 | 60 |
| ¾ | 6 | 48 |
| ¾ | 8 | 60 |
| ¾ | 10 | 70 |

Example 6

Example 3 was repeated except for using the same alumina powder-coated exhaust gas cleaner as in Example 4, and the removal ratio of NOx was measured under the same conditions as in Example 3. The measurement results are shown in Table 7.

TABLE 7

| Load | Amount of Sprayed Diesel oil (ml/minute) | Removal Ratio of NOx (%) |
|---|---|---|
| ¼ | 10 | 28 |
| ¼ | 20 | 38 |
| ¼ | 30 | 48 |
| ½ | 10 | 40 |
| ½ | 20 | 55 |
| ½ | 30 | 65 |
| ¾ | 10 | 48 |
| ¾ | 20 | 60 |
| ¾ | 30 | 75 |

Example 7

The same exhaust gas-cleaning apparatus as in Example 1 except for an exhaust gas cleaner was used, and an exhaust gas pipe 2 was connected to the same diesel engine as in Example 1. The exhaust gas cleaner used in this Example was prepared by coating a ceramic foam-type filter made of cordierite of Example 1 with fine $TiO_2$–$ZrO_2$ powder in an amount of 15 weight % based on the filter by a sol-gel method, immersing the coated filter in each aqueous solution of $CsNO_3$, $CuCl_2$ and $La(NO_3)_3$ and then drying and burning the catalyst-carrying filter. The amounts of Cs, Cu and La (each as a metallic component) are all 0.5 weight % based on the $TiO_2$–$ZrO_2$ layer.

With this exhaust gas-cleaning apparatus, the removal ratio of NOx was measured under the same conditions as in Example 1. The measurement results are shown in Table 8.

TABLE 8

| Load | Amount of Sprayed Diesel oil (ml/minute) | Removal Ratio of NOx (%) |
| --- | --- | --- |
| ¼ | 6 | 28 |
| ¼ | 8 | 33 |
| ¼ | 10 | 38 |
| ½ | 6 | 35 |
| ½ | 8 | 49 |
| ½ | 10 | 62 |
| ¾ | 6 | 50 |
| ¾ | 8 | 60 |
| ¾ | 10 | 70 |

Example 8

In the same exhaust gas-cleaning apparatus as in Example 7, a compressed air supply pipe was arranged such that it was in contact with the exhaust gas pipe 2, to control the temperature of the compressed air ejected from the nozzle to 200°–300° C. Other conditions were the same as in Example 7. Under engine loads of ¼, ½ and ¾, the removal ratio of NOx was measured. The measurement results are shown in Table 9.

TABLE 9

| Load | Amount of Sprayed Diesel oil (ml/minute) | Removal Ratio of NOx (%) |
| --- | --- | --- |
| ¼ | 6 | 28 |
| ¼ | 8 | 35 |
| ¼ | 10 | 40 |
| ½ | 6 | 35 |
| ½ | 8 | 51 |
| ½ | 10 | 65 |
| ¾ | 6 | 50 |
| ¾ | 8 | 62 |
| ¾ | 10 | 73 |

Example 9

Example 3 was repeated except for using the same exhaust gas cleaner (filter coated with the same $TiO_2$–$ZrO_2$ layer carrying the same catalyst of Cu, Cs and La) as in Example 7, and the removal ratio of NOx was measured under the same conditions as in Example 3. The measurement results are shown in Table 10.

TABLE 10

| Load | Amount of Sprayed Diesel oil (ml/minute) | Removal Ratio of NOx (%) |
| --- | --- | --- |
| ¼ | 10 | 15 |
| ¼ | 20 | 32 |
| ¼ | 30 | 42 |
| ½ | 10 | 36 |
| ½ | 20 | 50 |
| ½ | 30 | 60 |
| ¾ | 10 | 42 |
| ¾ | 20 | 55 |
| ¾ | 30 | 70 |

Example 10

A ceramic foam-type filter made of cordierite and mullite (apparent volume: 0.018 liter, apparent density: 0.42 g/ml, porosity: 50%) was immersed in a slurry consisting of 7 weight % of alumina powder (average particle size: 0.5 µm, specific surface area: 210 $m^2$/g), 3 weight % of commercially available alumina sol, and 90 weight % of water. After taking out of the slurry and drying, the alumina-coated filter was burned at 800° C. for 3 hours in the air to obtain the filter coated with 12 weight %, based on the filter, of alumina. This filter was impregnated with 0.5 weight % (as a metallic component) of Cs, 0.5 weight % (as a metallic component) of Cu and 0.5 weight % (as a metallic component) of La by immersion in aqueous solutions of $CsNO_3$, $CuCl_2$ and $La(NO_3)_3$, and then dried and burned at 700° C.

Figure 6:
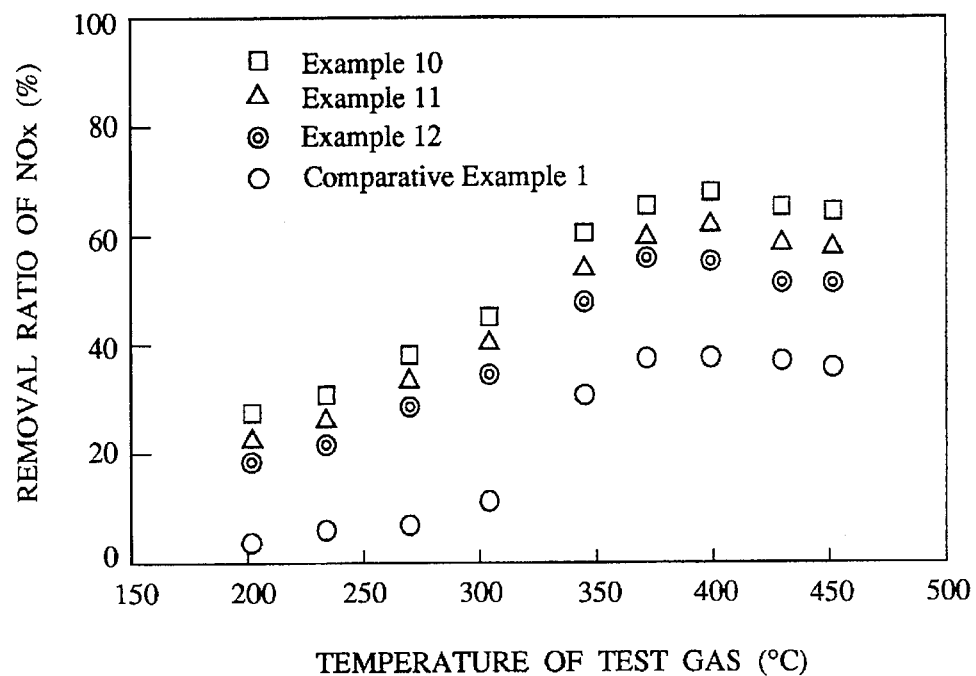
FIG. 6 is a graph showing the removal ratio of NOx in Examples 10–12 and Comparative Examples 1.

This exhaust gas cleaner was disposed in a gas reaction test apparatus, and a test gas consisting of 800 ppm of NOx, 10% of oxygen, 200 ppm of sulfur dioxide, the balance being nitrogen, was passed through the test apparatus at a flow rate of 12 liter/minute. Diesel oil in an amount (by weight) two times that of NOx in the test gas was introduced into the test apparatus at a point upstream of the exhaust gas cleaner. The removal ratio of NOx was measured at 200°–450° C. The results are shown in FIG. 6.

Comparative. Example 1

Example 10 was repeated except for using the same filter not coated with alumina and not carrying a catalyst, and the removal ratio of NOx was measured under the same conditions as in Example 10. The results are shown in FIG. 6.

Example 11

The same filter as in Example 10 was immersed in a mixed solution of tetraisopropyl titanate and zirconium-n-propoxide at a molar ratio of 1:1, and reacted with water vapor to cause gelation. Next, the filter was dried and burned at 700° C. to obtain the filter coated with 7.5 weight %, based on the filter, of a composite oxide of titania and zirconia Thereafter, the same catalytically active components as in Example 10 each in an amount of 0.5 weight % based on the titania-zirconia composite oxide were applied to the filter. In the resulting exhaust gas cleaner, the porous ceramic powder layer of the titania-zirconia composite oxide had a BET surface area of 41.8 $m^2$/g.

With this exhaust gas cleaner, the same test as in Example 10 was conducted by using the same amount of diesel oil at the same temperature as in Example 10, to measure the removal ratio of NOx. The results are shown in FIG. 6.

Example 12

The same filter as in Example 10 was immersed in a mixed solution of aluminum isopropoxide and ethyl silicate at a molar ratio of 1:1, and reacted with water vapor to cause gelation. Next, the filter was dried and burned at 700° C. to obtain the filter coated with 4.8 weight %, based on the filter, of a composite oxide of alumina and silica. Thereafter, the same catalytically active components as in Example 10 each in an amount of 0.5 weight % based on the alumina-silica composite oxide were applied to the filter. In the resulting exhaust gas cleaner, the porous ceramic powder layer of the alumina-silica composite oxide had a BET surface area of 109 $m^2$/g.

With this exhaust gas cleaner, the same test as in Example 10 was conducted by using the same amount of diesel oil at the same temperature as in Example 10, to measure the removal ratio of NOx. The results are shown in FIG. 6.

Examples 13–23

The same filter as in Example 10 was coated with alumina in the same manner as in Example 10, and each of the resulting coated filters was impregnated with the following catalyst components each in an amount of 0.5 weight % based on the fine alumina powder layer, dried and burned in the same manner as in Example 10. Incidentally, the impregnation of the catalyst components was conducted by using aqueous solutions of $CuCl_2$, $La(NO_3)_3$, $Ce(NO_3)_3$, $CsNO_3$, $COCl_2$, manganese acetate, and a mixture of an aqueous solution of $NH_4VO_3$ and oxalic acid.

Cs/Cu/Ce ($Al_2O_3$): (Example 13)
Cs/Cu ($Al_2O_3$): (Example 14)
Cs/Co/La ($Al_2O_3$): (Example 15)
Cs/Co/Ce ($Al_2O_3$): (Example 16)
Cs/Co ($Al_2O_3$): (Example 17)
Cs/Mn/Ce ($Al_2O_3$): (Example 18)
Cs/Mn/La ($Al_2O_3$): (Example 19)
Cs/V/Ce ($Al_2O_3$): (Example 20)
Cs/V/La ($Al_2O_3$): (Example 21)
Cs/Mn ($Al_2O_3$): (Example 22)
Cs/V ($Al_2O_3$): (Example 23)

With respect to each of these exhaust gas cleaners, the removal ratio of NOx was measured in the same manner as in Example 10. As a result, substantially the same level of the removal ratio of NOx as in Examples 10–12 was achieved by every exhaust gas cleaner.

Example 24

The same foam-type filter as in Example 10 was coated with alumina in the same manner as in Example 10. This filter was impregnated with 0.5 weight % (as a metallic component) of Cs, 0.5 weight % (as a metallic component) of Cu and 0.5 weight % (as a metallic component) of La by immersion in aqueous solutions of $CsNO_3$, $CuCl_2$, and $La(NO_3)_3$, and then dried and burned at 700° C. Next, this filter was immersed in a mixed aqueous solution of $NH_4VO_3$ and oxalic acid. After drying, it was burned again at 700° C.

Figure 7:
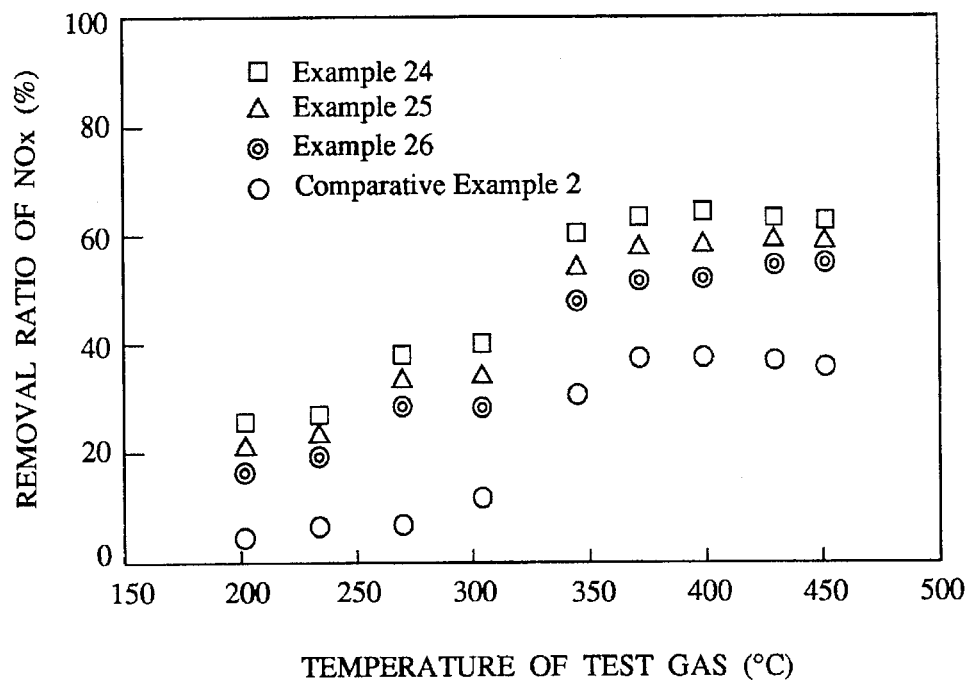
FIG. 7 is a graph showing the removal ratio of NOx in Examples 24–26 and Comparative Examples 2.

The resulting exhaust gas cleaner was disposed in the same gas reaction test apparatus as in Example 10, and the removal ratio of NOx was measured at 200°–450° C. in the same manner as in Example 10. Incidentally, diesel oil introduced into the test apparatus at a point upstream of the exhaust gas cleaner was in an amount (by weight) two times that of NOx in the test gas. The results are shown in FIG. 7.

Comparative Example 2

Example 24 was repeated except for using the same filter not coated with alumina and not carrying a catalyst, and the removal ratio of NOx was measured under the same conditions as in Example 24. The results are shown in FIG. 7.

Example 25

The same filter as in Example 24 was immersed in a mixed solution of tetraisopropyl titanate and zirconium-n-propoxide at a molar ratio of 1:1, and reacted with water vapor to cause gelation. Next, the filter was dried and burned at 700° C. to obtain the filter coated with 7.5 weight %, based on the filter, of a composite oxide of titania and zirconia. Thereafter, the same catalytically active components as in Example 24 each in an amount of 0.5 weight % based on the titania-zirconia composite oxide were applied to the filter. In the resulting exhaust gas cleaner, the porous ceramic powder layer of the titania-zirconia composite oxide had a BET surface area of 41.8 $m^2/g$.

With this exhaust gas cleaner, the same test as in Example 24 was conducted by using the same amount of diesel oil at the same temperature as in Example 24, to measure the removal ratio of NOx. The results are shown in FIG. 7.

Example 26

The same filter as in Example 24 was immersed in a mixed solution of aluminum isopropoxide and ethyl silicate at a molar ratio of 1:1, and reacted with water vapor to cause gelation. Next, the filter was dried and burned at 700° C. to obtain the filter coated with 4.8 weight %, based on the filter, of a composite oxide of alumina and silica. Thereafter, the same catalytically active components as in Example 24 each in an amount of 0.5 weight % based on the alumina-silica composite oxide were applied to the filter. In the resulting exhaust gas cleaner, the porous ceramic powder layer of the alumina-silica composite oxide had a BET surface area of 109 $m^2/g$.

With this exhaust gas cleaner, the same test as in Example 24 was conducted by using the same amount of diesel oil at the same temperature as in Example 24, to measure the removal ratio of NOx. The results are shown in FIG. 7.

Examples 27–33

The same filter as in Example 24 was coated with alumina in the same manner as in Example 24, and each of the resulting coated filters was impregnated with the following catalyst components each in an amount of 0.5 weight % based on the fine alumina powder layer, dried and burned in the same manner as in Example 24. Incidentally, the impregnation of the catalyst components was conducted by using aqueous solutions of $CuCl_2$, $La(NO_3)_3$, $Ce(NO_3)_3$, $CsNO_3$, $COCl_2$, manganese acetate, and a mixture of an aqueous solution of $NH_4VO_3$ and oxalic acid.

Cs/Cu/V/Ce ($Al_2O_3$): (Example 27)
Cs/Cu/V ($Al_2O_3$): (Example 28)
Cs/Co/V/La ($Al_2O_3$): (Example 29)
CslCo/V/Ce ($Al_2O_3$): (Example 30)
Cs/Co/V ($Al_2O_3$): (Example 31)
Cs/Mn/V/Ce ($Al_2O_3$): (Example 32)
Cs/Mn/V ($Al_2O_3$): (Example 33)

With respect to each of these exhaust gas cleaners, the removal ratio of NOx was measured in the same manner as in Example 24. As a result, substantially the same level of the removal ratio of NOx as in Examples 24–26 was achieved by every exhaust gas cleaner.

Example 34

The same filter as in Example 10 was immersed in a slurry consisting of 7 weight % of alumina powder (average particle size: 0.5 µm, specific surface area: 210 $m^2/g$), 3 weight % of commercially available alumina sol, and 90 weight % of water. After taking out of the slurry and drying, the alumina-coated filter was burned at 800° C. for 3 hours in the air to obtain the filter coated with 12 weight %, based on the filter, of alumina. This filter was impregnated with 0.2 weight % of Cs, 1 weight % of Cu and 1 weight % of La (as a metallic component) by immersion in aqueous solutions of $CsNO_3$, $Cu(NO_3)_2$, and $La(NO_3)_3$, and then dried and burned at 700° C.

This exhaust gas cleaner was disposed in a gas reaction test apparatus, and a test gas consisting of 800 ppm of NOx, 10% of oxygen, 200 ppm of sulfur dioxide, the balance being nitrogen, was passed through the test apparatus at a flow rate of 12 liter/minute. Heptane ($C_7H_{16}$) in an amount (by weight) two times that of NOx in the exhaust gas was introduced into the test apparatus at a point upstream of the exhaust gas cleaner. The removal ratio of NOx was measured at 200°–450° C. The results are shown in FIG. 8.

Figure 8:
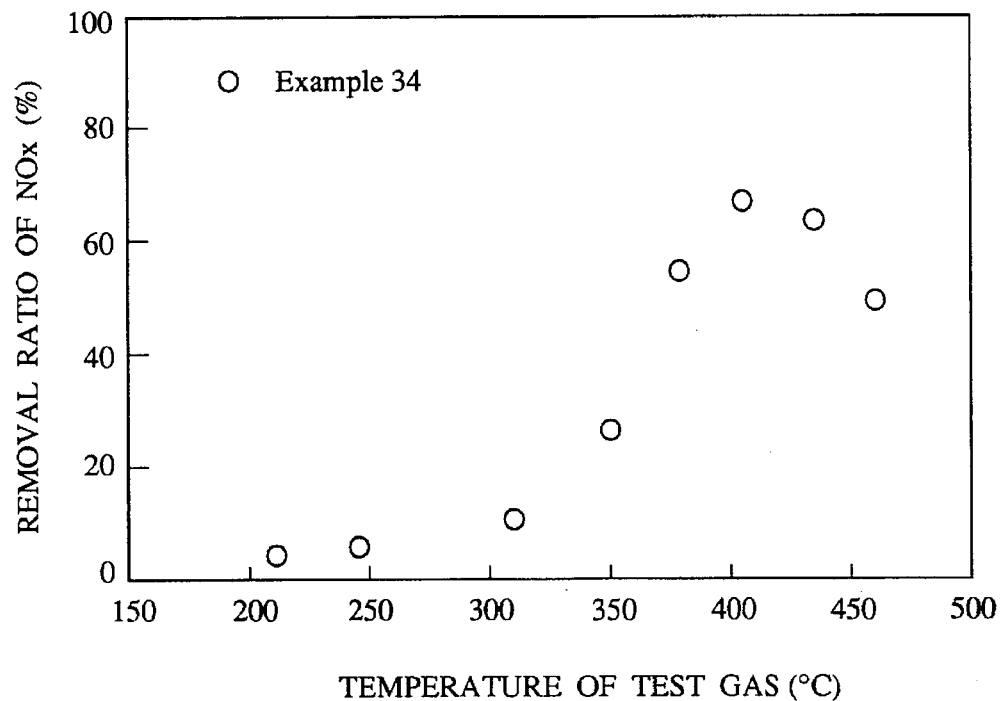
FIG. 8 is a graph showing the removal ratio of NOx in Example 34.

As is clear from FIG. 8, good efficiency of removing NOx can be achieved at a temperature between about 370° C. and about 450° C. in the case of adding $C_7H_{16}$.

Example 35

Pellets made of γ-alumina (specific surface area: 250 m²/g) was impregnated with 2.5 weight % (as a metal component) of $Cu(NO_3)_2$ and 2.5 weight % (as a metal component) of $La(NO_3)_3$, both based on the pellets, by using aqueous solutions of $Cu(NO_3)_2$ and $La(NO_3)_3$. The impregnated pellets were dried and burned at 700° C. to obtain an exhaust gas cleaner. Incidentally, Cu and La exist in the exhaust gas cleaner in the form of oxide.

This exhaust gas cleaner was disposed in a gas reaction test apparatus, and a test gas (resembling a diesel engine exhaust gas) consisting of 800 ppm of NO, 800 ppm of $C_3H_6$, 10% of oxygen, the balance being nitrogen, was passed through the test apparatus at a contact time of 0.15 sec.·g/cm³. The removal ratio of NO was measured at 300°–550° C. Incidentally, the removal ratio of NO was calculated by the formula: [concentration of NO before treatment—concentration of $(NO+NO_2)$ after treatment]/concentration of NO before treatment×100%. The results are shown in Table 11.

Example 36

In the same manner as in Example 35, pellets made of $TiO_2$–$ZrO_2$ (specific surface area: 45 m²/g) was impregnated with 2.5 weight % (as a metal component) of $Cu(NO_3)_2$ and 2.5 weight % (as a metal component) of $Ce(NO_3)_3$, based on the pellets, by using aqueous solutions of $Cu(NO_3)_2$ and $Ce(NO_3)_3$. The impregnated pellets were dried and burned at 700° C. to obtain an exhaust gas cleaner. Incidentally, Cu and Ce exist in the exhaust gas cleaner in the form of oxide.

With this exhaust gas cleaner, the removal ratio of NO was measured in the same manner as in Example 35. The results are shown in Table 11.

TABLE 11

| No. | Removal Ratio (%)[1] of NO at | | | | | |
|---|---|---|---|---|---|---|
| | 300° C. | 350° C. | 400° C. | 450° C. | 500° C. | 550° C. |
| Example 35 | 30 | 40 | 30 | 25 | 18 | 10 |
| Example 36 | 25 | 34 | 28 | 27 | 18 | 10 |

Note: [1]Calculated from the amount (A) of NO in the exhaust gas before entering the exhaust gas cleaner and the total amount (B) of NO and $NO_2$ in the exhaust gas which passed through the exhaust as cleaner, by the formula: $(A - B)/A \times 100\%$.

As is clear from Table 11, the exhaust gas cleaner of Examples 35 and 36 are effective for removing NO at a low temperature.

Example 37

30 g of commercially available pellets made of γ-alumina (diameter: 1.5 mm, length: about 6 mm, specific surface area: 250 m²/g) was impregnated with 10 weight % (as a metal component) of $Cu(NO_3)_2$, 0.4 weight % (as a metal component) of $La(NO_3)_3$, and 0.4 weight % (as a metal component) of $CsNO_3$, based on the pellets, by using aqueous solutions of $Cu(NO_3)_2$, $La(NO_3)_3$ and $CsNO_3$. The impregnated pellets were dried and burned at 700° C. to obtain an exhaust gas cleaner. Incidentally, Cu, La and Cs exist in the exhaust gas cleaner in the form of oxide.

This exhaust gas cleaner was disposed in a reaction pipe, and a test gas having the following composition:

| Component | Concentration |
|---|---|
| Nitrogen monoxide | 800 ppm |
| Carbon dioxide | 10 volume % |
| Oxygen | 10 volume % |
| Propylene | 1714 ppm (three times the weight of NO) |
| Nitrogen | Balance | was passed through the reaction pipe at a space velocity (S.V.) of 15000–45000 h⁻¹ (contact time: 0.1–0.03 sec.·g/ml), while keeping the temperature inside the reaction pipe at 400° C., to cause a reaction of propylene with nitrogen oxides.

Figure 9:
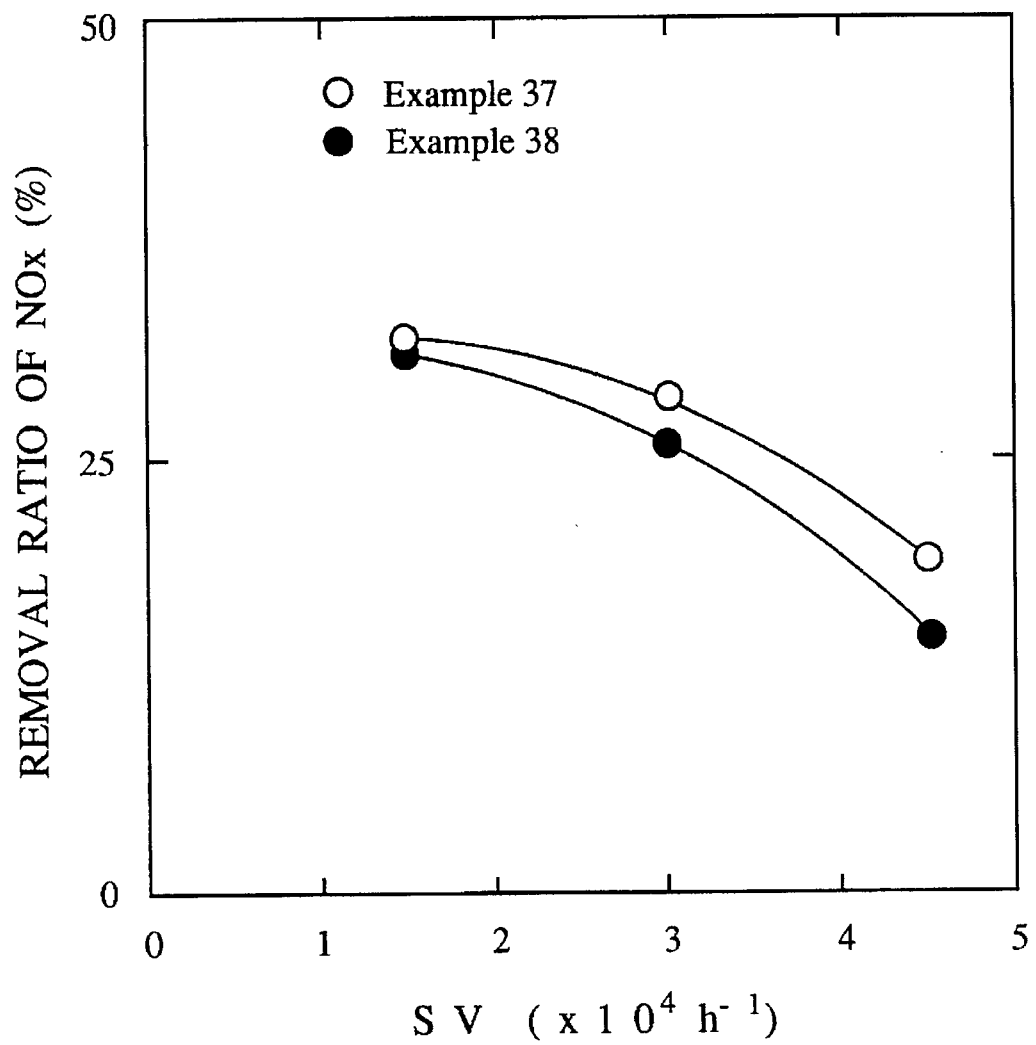
FIG. 9 is a graph showing the relation between the removal ratio of NOx and a space velocity of the exhaust gas in Examples 37 and 38.

After passing through the reaction pipe, the concentration of NOx (sum of nitrogen monoxide and nitrogen dioxide) in the exhaust gas was measured by a chemiluminescence analyzer to determine the removal ratio of NOx. The results are shown in FIG. 9.

Example 38

30 g of the same pellets as in Example 37 was impregnated with 5 weight % (as a metal component) of $Cu(NO_3)_2$, 0.2 weight % (as a metal component) of $Ce(NO_3)_3$, and 0.2 weight % (as a metal component) of $CsNO_3$, based on the pellets, by using aqueous solutions of $Cu(NO_3)_2$, $Ce(NO_3)_3$ and $CsNO_3$. The impregnated pellets were dried and burned at 700° C. to obtain an exhaust gas cleaner. Incidentally, Cu, Ce and Cs exist in the exhaust gas cleaner in the form of oxide.

This exhaust gas cleaner was disposed in the same reaction pipe as in Example 37, and the same measurement as in Example 37 was conducted. The results are shown in FIG. 9.

Example 39

30 g of commercially available pellets made of γ-alumina (diameter: 1.5 mm, length: about 6 mm, specific surface area: 250 m²/g) was impregnated with 10 weight % (as a metal component) of $Cu(NO_3)_2$, 0.4 weight % (as a metal component) of $La(NO_3)_3$, and 0.4 weight % (as a metal component) of $CsNO_3$, based on the pellets, by using aqueous solutions of $Cu(NO_3)_2$, $La(NO_3)_3$ and $CsNO_3$. The impregnated pellets were dried and burned at 700° C. to obtain an exhaust gas cleaner. Incidentally, Cu, La and Cs exist in the exhaust gas cleaner in the form of oxide.

This exhaust gas cleaner was disposed in a reaction pipe, and a first test gas having the following composition:

| Component | Concentration |
|---|---|
| Nitrogen monoxide | 800 ppm |
| Carbon dioxide | 10 volume % |
| Oxygen | 10 volume % |
| Diesel oil* | three times the weight of NO |
| Nitrogen | Balance |

Note: *Containing 0.47% of sulfur.

was passed through the reaction pipe at a space velocity (S.V.) of 15000–45000 h⁻¹ (contact time: 0.1–0.03 sec.·g/ml), while keeping the temperature inside the reaction pipe at 400° C., to cause a reaction of diesel oil with nitrogen oxides.

Figure 10:
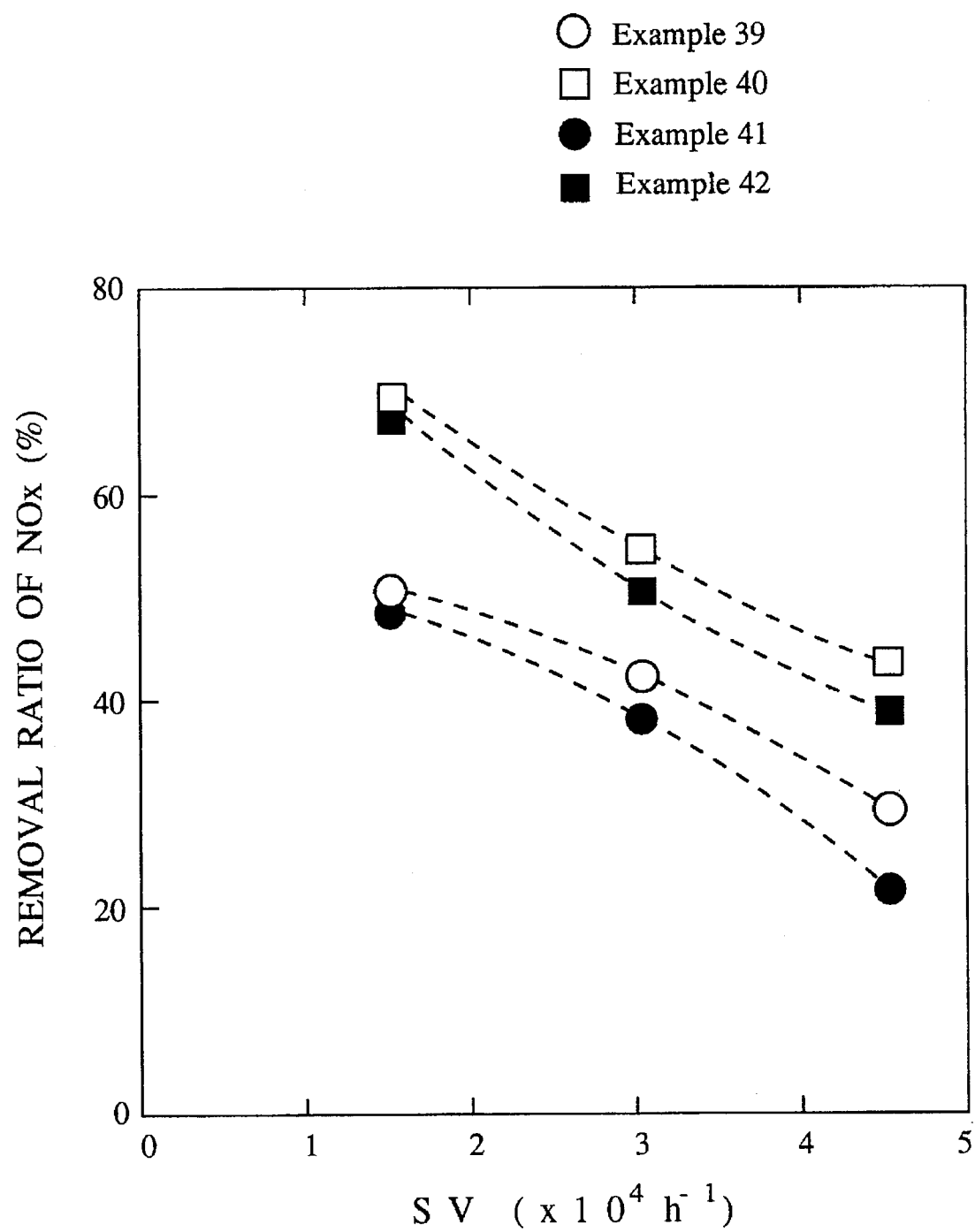
FIG. 10 is a graph showing the relation between the removal ratio of NOx and a space velocity of the exhaust gas in Examples 39–42.

After passing through the reaction pipe, the concentration of NOx (sum of nitrogen monoxide and nitrogen dioxide) in the exhaust gas was measured by a chemiluminescence analyzer to determine the removal ratio of NOx. The results are shown in FIG. 10.

Example 40

The same exhaust gas cleaner as in Example 39 was disposed in a reaction pipe, and a second test gas having the following composition:

| Component | Concentration |
|---|---|
| Nitrogen monoxide | 800 ppm |
| Carbon dioxide | 10 volume % |
| Oxygen | 10 volume % |
| Heptane ($C_7H_{16}$) | 720 ppm (three times the weight of NO) |
| Nitrogen | Balance | was passed through the reaction pipe at a space velocity (S.V.) of 15000–45000 $h^{-1}$ (contact time: 0.1–0.03 sec·g/ml), while keeping the temperature inside the reaction pipe at 400° C., to cause a reaction of heptane with nitrogen oxides.

After passing through the reaction pipe, the concentration of NOx (sum of nitrogen monoxide and nitrogen dioxide) in the exhaust gas was measured by a chemiluminescence analyzer to determine the removal ratio of NOx. The results are shown in FIG. 10.

Example 41

30 g of the same pellets as in Example 39 was impregnated with 5 weight % (as a metal component) of $Cu(NO_3)_2$, 0.2 weight % (as a metal component) of $Ce(NO_3)_3$, and 0.2 weight % (as a metal component) of $CsNO_3$, based on the pellets, by using aqueous solutions of $Cu(NO_3)_2$, $Ce(NO_3)_3$ and $CsNO_3$. The impregnated pellets were dried and burned at 700° C. to obtain an exhaust gas cleaner. Incidentally, Cu, Ce and Cs exist in the exhaust gas cleaner in the form of oxide.

This exhaust gas cleaner was disposed in the same reaction pipe as in Example 39, and the same measurement as in Example 39 was conducted with the first test gas. The results are shown in FIG. 10.

Example 42

30 g of the same pellets as in Example 40 was impregnated with 5 weight % (as a metal component) of $Cu(NO_3)_2$, 0.2 weight % (as a metal component) of $Ce(NO_3)_3$, and 0.2 weight % (as a metal component) of $CsNO_3$, based on the pellets, by using aqueous solutions of $Cu(NO_3)_2$, $Ce(NO_3)_3$ and $CsNO_3$. The impregnated pellets were dried and burned at 700° C. to obtain an exhaust gas cleaner. Incidentally, Cu, Ce and Cs exist in the exhaust gas cleaner in the form of oxide.

This exhaust gas cleaner was disposed in the same reaction pipe as in Example 40, and the same measurement as in Example 40 was conducted with the second test gas. The results are shown in FIG. 10.

As is clear from FIG. 10, NOx was efficiently removed by the method of the present invention, even with a short contact time of 0.1–0.03 sec.·g/ml (space velocity of 15000–45000 $h^{-1}$).

As described above in detail, by the exhaust gas cleaning method according to the present invention, NOx can efficiently be removed from the exhaust gas at such a low temperature as 200°–500° C., because finely atomized hydrocarbon is introduced into the exhaust gas and caused to react with NOx efficiently. Also, the removal ratio of NOx can be increased by coating the porous body of the exhaust gas cleaner with a porous ceramic powder layer and further by carrying a catalyst having the above-described composition.

The method and apparatus of the present invention are effective for cleaning exhaust gases such as those discharged from diesel engines, which have high oxygen concentrations.

What is claimed is:

1. A method of cleaning an exhaust gas containing nitrogen oxides and oxygen in a larger amount than a stoichiometric amount relative to unburned components in said exhaust gas, which comprises disposing an exhaust gas cleaner comprising a heat-resistant, porous ceramic body and a catalyst supported by said porous ceramic body in a flow path of said exhaust gas;

introducing a liquid hydrocarbon which is in a liquid state at room temperature and 1 atmosphere into a stream of said exhaust gas on the upstream side of said exhaust gas cleaner; and bringing said liquid hydrocarbon into contact with said catalyst at a temperature of 200°–600° C., said catalyst consisting essentially of V and Cu, a weight ratio of said Cu to V being in the range of 5/1 to 1/15, said catalyst being 5–20 weight % as a metal component based on said porous ceramic body, whereby said liquid hydrocarbon is reacted as a reducing agent with nitrogen oxides in said exhaust gas.

2. The method of cleaning an exhaust gas according to claim 1, wherein the contact time of said exhaust gas with said catalyst is 0.15 sec·g-catalyst or less per normal mL of said exhaust gas.

3. The method of cleaning an exhaust gas according to claim 1, wherein said heat-resistant, porous ceramic body is made of a ceramic material selected from the group consisting of $Al_2O_3$, an $Al_2O_3$ composite oxide, $TiO_2$, a $TiO_2$ composite oxide, $ZrO_2$, and a $ZrO_2$ composite oxide.

4. A method according to claim 1 wherein said liquid hydrocarbon has a boiling point of 160°–340° C., and wherein the weight ratio of liquid hydrocarbon to NOx in the exhaust gas is 0.2–3.1.

5. A method of cleaning an exhaust gas containing nitrogen oxides, which comprises disposing an exhaust gas cleaner comprising a catalyst supported by a heat-resistant, porous body in a flow path of said exhaust gas, spraying a liquid hydrocarbon which is in a liquid state at room temperature and 1 atmosphere into a stream of said exhaust gas on the upstream side of said exhaust gas cleaner, said catalyst consisting essentially of:

(a) 10–50 weight % of Cs;
   (b) 15–65 weight % of transition elements composed of V and at least one of elements selected from the group consisting of Cu, Co and Mn, a weight ratio of said at least one element selected from the group consisting of Cu, Co and Mn to V being in the range of 5/1 to 1/15; and
   (c) 10–50 weight % of at least one member selected from the group consisting of Ce and La, and the temperature of said exhaust gas passing through said cleaner being kept at 200°–600° C. thereby causing atomized and gasified hydrocarbon to function as a reducing agent for reducing said nitrogen oxides in said exhaust gas.

6. The method of cleaning an exhaust gas according to claim 5; wherein the spraying of said liquid hydrocarbon is carried out by using a compressed air.

7. The method of cleaning an exhaust gas according to claim 6, wherein said compressed air is heated before introduced into said exhaust gas.

8. The method of cleaning an exhaust gas according to claim 6, wherein an oxygen concentration in said exhaust gas is controlled by adjusting the pressure and flow rate of said compressed air introduced into said exhaust gas.

9. The method of cleaning an exhaust gas according to claim 5, wherein said liquid hydrocarbon is diesel oil.

10. The method of cleaning an exhaust gas according to claim 5, wherein the contact time of said exhaust gas with said catalyst if 0.15 sec·g-catalyst or less per 1 normal mL of said exhaust gas.

11. The method of cleaning an exhaust gas according to claim 5, wherein said heat-resistant, porous ceramic body is made of a ceramic material selected from the group consisting of $Al_2O_3$, an $Al_2O_3$ composite oxide, $TiO_2$, a $TiO_2$ composite oxide, $ZrO_2$, and a $ZrO_2$ composite oxide.

12. A method according to claim 5 wherein said liquid hydrocarbon has a boiling point of 160°–340° C.

13. A method according to claim 5 wherein said liquid hydrocarbon is diesel fuel, kerosine, cetane or heptane.

14. A method according to claim 5 wherein the weight ratio of liquid hydrocarbon to NOx in the exhaust gas is 0.2–3.1.

15. A method of cleaning an exhaust gas containing nitrogen oxides, which comprises disposing an exhaust gas cleaner comprising a heat-resistant, porous filter having a porosity of 20–90% and coated with a porous ceramic powder layer having a specific surface area of 2 $m^2/g$ or more, in a flow path of said exhaust gas, spraying a liquid hydrocarbon which is in a liquid state at room temperature and 1 atmosphere into a stream of said exhaust gas on the upstream side of said exhaust gas cleaner, said heat-resistant, porous filter further carrying a catalyst via said porous ceramic powder layer, said catalyst consisting essentially of:

(a) 10—50 weight % of Cs; and (b) 50–90 weight % of transition elements composed of V and at least one element selected from the group consisting of Cu, Co and Mn, a weight ratio of said at least one element selected from the group consisting of Cu, Co and Mn to V being in the range of 5/1 to 1/15, said porous ceramic powder layer being 5–20 weight % based on said porous body, said catalyst being 0.05–15 weight % based on said porous ceramic powder layer, and the temperature of said exhaust gas passing through said exhaust gas cleaner being kept at 200°–600° C., whereby said liquid hydrocarbon functions as a reducing agent for reducing nitrogen oxides in said exhaust gas.

16. The method of cleaning an exhaust gas according to claim 15, wherein said catalyst further contains (c) a rare earth element.

17. The method of cleaning an exhaust gas according to claim 15, wherein said liquid hydrocarbon is diesel oil, and the temperature of the exhaust gas is kept at 250°–550° C.

18. The method of cleaning an exhaust gas according to claim 15, wherein a weight ratio of said liquid hydrocarbon added to said exhaust gas to NOx in said exhaust gas is 0.2–3.

19. The method of cleaning an exhaust gas according to claim 16, wherein said component (c) is selected from the group consisting of La, Ce, Nd and Sm.

20. A method according to claim 15 wherein said liquid hydrocarbon has a boiling point of 160°–340° C., and wherein the weight ratio of liquid hydrocarbon to NOx in the exhaust gas is 0.2–3:1.

21. A method of cleaning an exhaust gas containing nitrogen oxides, which comprises disposing an exhaust gas cleaner comprising a heat-resistant, porous ceramic body in a flow path of said exhaust gas, said porous ceramic body having a porous ceramic layer formed on a surface thereof with said porous ceramic powder layer being 5–20 weight % based on said porous ceramic body, and introducing liquid hydrocarbons in a liquid state at room temperature and 1 atmosphere into a stream of said exhaust gas on the upstream side of said exhaust gas cleaner, said heat-resistant, porous ceramic body carrying a catalyst consisting essentially of:

(a) 40–90 weight % of transition elements composed of V and at least one element selected from the group consisting of Cu, Co and Mn, a weight ratio of said at least one element selected from the group consisting of Cu, Co and Mn to V being in the range of 5/1 to 1/15; and (b) 10–60 weight % of at least one member selected from the group consisting of Ce and La, said catalyst being 0.5–15 weight % based on said porous ceramic body, and the temperature of said exhaust gas passing through said exhaust gas cleaner being kept at 200°–600° C., whereby gasified hydrocarbon functions as a reducing agent for reducing nitrogen oxides in said exhaust gas.

22. The method of cleaning an exhaust gas according to claim 21, wherein said heat-resistant, porous ceramic body is in the shape of pellet.

23. The method of cleaning an exhaust gas according to claim 21, wherein said heat-resistant, porous ceramic body is made of a ceramic material selected from the group consisting of $Al_2O_3$, an $Al_2O_3$ composite oxide, $TiO_2$, $ZrO_2$, and $TiO_2$—$ZrO_2$.

24. A method according to claim 21 wherein said liquid hydrocarbon has a boiling point of 160°–340° C., and wherein the weight ratio of liquid hydrocarbon to NOx in the exhaust gas is 0.2–3:1.

* * * * *